United States Patent
Fujishiro et al.

(10) Patent No.: US 9,867,107 B2
(45) Date of Patent: Jan. 9, 2018

(54) COMMUNICATION CONTROL METHOD, MASTER BASE STATION, SECONDARY BASE STATION, AND USER TERMINAL

(71) Applicant: KYOCERA CORPORATION, Kyoto (JP)

(72) Inventors: Masato Fujishiro, Yokohama (JP); Fangwei Tong, Machida (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/009,441

(22) Filed: Jan. 28, 2016

(65) Prior Publication Data

US 2016/0227459 A1 Aug. 4, 2016

Related U.S. Application Data

(63) Continuation of application No. PCT/JP2015/052764, filed on Jan. 30, 2015.

(Continued)

(51) Int. Cl.
| | |
|---|---|
| *H04W 36/16* | (2009.01) |
| *H04W 76/04* | (2009.01) |
| *H04W 36/06* | (2009.01) |
| *H04L 29/12* | (2006.01) |
| *H04W 36/28* | (2009.01) |

(Continued)

(52) U.S. Cl.
CPC ....... *H04W 36/28* (2013.01); *H04L 29/12575* (2013.01); *H04W 16/32* (2013.01); *H04W 36/0055* (2013.01); *H04W 36/06* (2013.01); *H04W 36/165* (2013.01); *H04W 76/046* (2013.01); *H04W 88/08* (2013.01); *H04W 88/16* (2013.01)

(58) Field of Classification Search
CPC . H04W 24/02; H04W 56/00; H04W 72/0426; H04W 84/045; H04W 76/02; H04W 8/082; H04W 36/08
See application file for complete search history.

(56) References Cited

U.S. PATENT DOCUMENTS

| | | | |
|---|---|---|---|
| 2010/0260109 A1* | 10/2010 | Ulupinar | H04L 12/4633 370/328 |
| 2011/0249610 A1* | 10/2011 | Ho | H04B 7/2606 370/315 |

(Continued)

OTHER PUBLICATIONS

International Search Report issued in PCT/JP2015/052764; dated Apr. 7, 2015.

(Continued)

*Primary Examiner* — Romani Ohri
(74) *Attorney, Agent, or Firm* — Studebaker & Brackett PC

(57) ABSTRACT

A master evolved Node-B (MeNB) connects to a user terminal together with a secondary evolved Node-B (SeNB) in a dual connectivity scheme. The MeNB includes: transmitter configured to transmit a message to the SeNB via an X2 interface. The message is an SeNB addition request message or an SeNB modification request message. The message includes identification information of a serving gateway connected with the MeNB via an S1 interface. The identification information includes an S1 tunnel endpoint ID (S1-TEID) of the serving gateway or an internet protocol (IP) address of the serving gateway.

16 Claims, 23 Drawing Sheets

Related U.S. Application Data

(60) Provisional application No. 61/934,350, filed on Jan. 31, 2014.

(51) Int. Cl.
  H04W 16/32 (2009.01)
  H04W 36/00 (2009.01)
  H04W 88/08 (2009.01)
  H04W 88/16 (2009.01)

(56) References Cited

U.S. PATENT DOCUMENTS

| | | | | |
|---|---|---|---|---|
| 2011/0310791 | A1* | 12/2011 | Prakash | H04W 24/02 370/315 |
| 2012/0264417 | A1* | 10/2012 | Gao | H04W 36/0083 455/422.1 |
| 2014/0010207 | A1* | 1/2014 | Horn | H04W 36/165 370/332 |
| 2015/0215965 | A1* | 7/2015 | Yamada | H04W 76/046 370/329 |
| 2015/0282238 | A1* | 10/2015 | Aminaka | H04W 76/022 370/329 |
| 2015/0351139 | A1* | 12/2015 | Zhang | H04W 52/0251 370/329 |
| 2015/0365984 | A1* | 12/2015 | Lee | H04W 76/02 370/329 |
| 2015/0373584 | A1* | 12/2015 | Hong | H04W 28/08 370/329 |
| 2016/0066241 | A1* | 3/2016 | Wu | H04W 36/28 370/331 |

OTHER PUBLICATIONS

Written Opinion issued in PCT/JP2015/052764; dated Apr. 7, 2015.
3rd Generation Partnership Project;Technical Specification Group Radio Access Network; Study on Small Cell enhancements for E-UTRA and E-UTRAN; Higher layer aspects; 3GPP; TR 36.842; V12.0.0; Dec. 2013; pp. 1-71; Release 12; 3GPP Organizational Partners.
ZTE Corporation; "Analysis on the Solutions for the Prioritized Scenarios of MeNB Handover"; 3GPP; TSG-RAN3 Meeting #83; R3-140053; Feb. 10-14, 2014; pp. 1-6; Prague, Czech Republic.
Catt; "Consideration of MCG hanover for Dual Connectivity"; 3GPP; TSG RAN WG2#85; R2-140189; Feb. 10-14, 2014; pp. 1-5; Prague, Czech Republic.
Blackberry UK Limited; "Further Discussion on U-Plane Protocol Architecture Design Options"; 3GPP; TSG RAN WG2 Meeting #83bis; R2-133332; Oct. 7-11, 2013; pp. 1-5; Ljubljana, Slovenia.
CMCC; "Handling of MeNB HO and SeNB change for dual connectivity operation"; 3GPP; TSG RAN WG2 Meeting #85; R2-140135; Feb. 10-14, 2014; pp. 1-8; Prague, Czech Republic.
Intel Corporation; "SeNB switching procedure in dual connectivity"; 3GPP; TSG-RAN WG2 Meeting #85; R2-140258; Feb. 10-14, 2014; pp. 1-5; Prague, Czech Republic.
ZTE Corporation; "Signalling flows of solution 1A"; 3GPP; TSG-RAN3 Meeting #82; R3-132204; Nov. 11-15, 2013; pp. 1-8; San Francisco, CA, USA.
Ericsson; "Signalling procedures for dual connectivity"; 3GPP; TSG-RAN WG2 #84; R2-134219; Nov. 11-15, 2013; pp. 1-8; San Francisco, CA, USA.
Kyocera; "Handover enhancements with dual connectivity"; 3GPP; TSG-RAN WG2 #85; R2-140698; Feb. 10-14, 2014; pp. 1-9; Prague, Czech Republic.
An Office Action; "Notice of Reasons for Rejection," issued by the Japanese Patent Office on Sep. 13, 2016, which corresponds to Japanese Patent Application No. 2015-560053 and is related to U.S. Appl. No. 15/009,441; with English language statement of relevance.
NSN et al.; "Handover procedure in case of bearer only served by SeNB (1A)"; 3GPP TSG-RAN WG3 Meeting #82; R3-132101; Nov. 11-15, 2013; pp. 1-14; San Francisco, USA.
The extended European search report issued by the European Patent Office on Jul. 4, 2017, which corresponds to European Patent Application No. 15743524.9-1854 and is related to U.S. Appl. No. 15/009,441.
NSN et al.; "Handover procedure in case of bearer served by MeNB and SeNB (3C)"; 3GPP TSG-RAN WG3 Meeting #82; R3-132102; Nov. 11-15, 2013; pp. 1-8; San Francisco, USA.
Ericsson; "Mobility procedures for dual connectivity"; 3GPP TSG-RAN WG2 #85; Tdoc R2-140642; Feb. 10-14, 2014; pp. 1-4; Prague, Czech Republic.

* cited by examiner

COMMUNICATION CONTROL METHOD, MASTER BASE STATION, SECONDARY BASE STATION, AND USER TERMINAL

CROSS REFERENCE

The entire contents of U.S. Provisional Application No. 61/934,350 (filed on Jan. 31, 2014) are incorporated herein by reference.

TECHNICAL FIELD

The present disclosure relates to a communication control method, a master base station, a secondary base station, and a user terminal which are used in a mobile communication system.

BACKGROUND ART

In the 3GPP (3rd Generation Partnership Project), which is a standardization project of mobile communication systems, efficient use of a specific base station (e.g., a small cell base station) with a narrower coverage than that of a general base station (e.g., a macro cell base station) is being considered.

In the 3GPP, introduction of a dual connectivity scheme (Dual connectivity) is planned in Release 12 or thereafter (see Non Patent Literature 1). In the dual connectivity scheme, user terminal establishes connections with a plurality of base stations (a general base station and a specific base station) simultaneously. Since radio resources are assigned to the user terminal from each base station, an improvement in throughput is expected. The dual connectivity scheme is referred also to as inter-base station carrier aggregation (inter-eNB CA).

In the dual connectivity scheme, only one base station (hereafter referred to as a "master base station") establishes an RRC connection with the user terminal among a plurality of base stations that establish connections with the user terminal. On the other hand, another base station among the plurality of base stations (hereafter referred to as a "secondary base station") does not establish an RRC connection with the user terminal but provides the user terminal with additional radio resources.

PRIOR ART LITERATURES

Non Patent Literature

[Non Patent Literature 1] 3GPP technical report "TR 36.842 V12.0.0" Jan. 7, 2014

SUMMARY

User terminal in an RRC connected state performs handover for switching an RRC connection in association with a movement.

However, if the user terminal in the RRC connected state performs communication in a dual connectivity scheme, there is a problem that a process related to the handover of the user terminal becomes complicated.

Then, an object of the present disclosure is to provide a communication control method, a master base station, a secondary base station, and a user terminal that implement efficient handover in the dual connectivity scheme.

A communication control method according to a first aspect is a method in a mobile communication system that supports a dual connectivity scheme using: a master base station that establishes an RRC connection with a user terminal; and a secondary base station that provides the user terminal with additional radio resources. The communication control method includes: when a handover of the user terminal related to the master base station is performed after starting communication of the dual connectivity scheme, transmitting, from the master base station to the user terminal, a handover command instructing the handover. In the transmitting the handover command, the master base station transmits the handover command including secondary base station information relating to configurations of the secondary base station, to the user terminal.

In the first aspect, the secondary base station information is information that configures, to the user terminal, a release of configurations of the secondary base station.

In the first aspect, the handover command including the secondary base station information is formed by one RRC reconfiguration message.

In the first aspect, the master base station is a source master base station which is a source in the handover. The handover is an inter-base station handover from the source master base station to a target base station.

In the first aspect, the communication control method further includes establishing, by the user terminal that has received the secondary base station information with the handover command, a new RRC connection with the target base station in response to the handover command while releasing configurations of the secondary base station in accordance with the secondary base station information.

In the first aspect, the communication control method further includes: transmitting, from the source master base station to the target base station, a handover request when performing the handover; receiving, by the source master base station, a handover acknowledgement from the target base station when the target base station admits the handover request; and transmitting, from the source master base station to the secondary base station, a resource release request in response to receive the handover acknowledgement.

In the first aspect, the source master base station transmits the handover command including the secondary base station information to the user terminal, after transmitting the resource release request.

In the first aspect, the communication control method further includes transmitting, from the source master base station to the target base station, a handover request including information on the secondary base station when performing the handover.

In the first aspect, the communication control method further includes: transmitting, from the target base station to a core network, a switch request for switching data path from the source master base station; receiving, by the target base station, an acknowledgement for the switch request from the core network; and transmitting, from the target base station to the source master base station, a context release request requesting a release of context information of the user terminal in response to receive the acknowledgement.

In the first aspect, the communication control method further includes determining, by the source master base station, whether to release a connection between the secondary base station and the user terminal, when determining the handover or when a handover acknowledgement is received from the target base station.

In the first aspect, the communication control method further includes transmitting, from the target base station to a core network, a path switch request for collectively switching a data path between the source master base station and the core network and a data path between the secondary base station and the core network to the target base station.

In the first aspect, the secondary base station information is information configuring maintenance of a connection between the secondary base station and the user terminal.

In the first aspect, the communication control method further includes establishing, by the user terminal that has received the secondary base station information with the handover command, a new RRC connection with a target base station in response to the handover command while maintaining the connection with the secondary base station in accordance with the secondary base station information.

In the first aspect, the communication control method further includes transmitting, from the source master base station to a target base station, information indicating that the handover is performed while maintaining the connection between the secondary base station and the user terminal.

In the first aspect, the communication control method further includes transmitting, from the source master base station to the secondary base station, information indicating that the master base station corresponding to the user terminal is switched from the source master base station to a target base station.

In the first aspect, the communication control method further includes determining whether to perform the handover after releasing a connection between the secondary base station and the user terminal or to perform the handover while maintaining a connection between the secondary base station and the user terminal, on the basis of whether a dual connectivity scheme using a data path architecture in which a data path between the secondary base station and a core network passes through the master base station is applicable.

In the first aspect, the communication control method further includes determining whether to perform the handover after releasing a connection between the secondary base station and the user terminal or to perform the handover while maintaining a connection between the secondary base station and the user terminal, on the basis of whether a serving gateway that accommodates the target base station and a serving gateway that accommodates the secondary base station coincide with each other.

A master base station according to a second aspect performs, with a user terminal, communication of a dual connectivity scheme together with a secondary base station. The master base station includes a transmitter configured to transmit, to the user terminal, a handover command instructing a handover when a handover of the user terminal related to the master base station is performed after starting communication of the dual connectivity scheme. The transmitter transmits the handover command including secondary base station information relating to configurations of the secondary base station.

A user terminal according to a third aspect performs communication of a dual connectivity scheme with a master base station and a secondary base station. The user terminal includes a receiver configured to receive, from the master base station, a handover command instructing a handover when a handover of the user terminal related to the master base station is performed after starting communication of the dual connectivity scheme. The receiver receives the handover command including secondary base station information relating to configurations of the secondary base station.

A communication control method according to a fourth aspect is a method in a mobile communication system that supports a dual connectivity scheme using: a master base station that establishes an RRC connection with user terminal; and a secondary base station that provides the user terminal with additional radio resources. The communication control method includes: when the secondary base station is switched from a source secondary base station to a target secondary base station after starting communication of the dual connectivity scheme, transmitting, from the master base station to the user terminal, establishment configuration information to add configurations for a connection between the target secondary base station and the user terminal.

In the fourth aspect, in transmitting the establishment configuration information, the master base station transmits, to the user terminal, release configuration information to release configurations for a connection between the source secondary base station and the user terminal, together with the establishment configuration information.

In the fourth aspect, in transmitting the release configuration information, the master base station transmits one RRC reconfiguration message including the release configuration information and the establishment configuration information, to the user terminal.

In the fourth aspect, the master base station transmits the establishment configuration information to the user terminal, after completing a secondary base station release process between the master base station and the source secondary base station, and a secondary base station addition process between the master base station and the target secondary base station.

In the fourth aspect, the communication control method further includes: transmitting "SN status transfer" message from the source secondary base station to the target secondary base station via the master base station; and forwarding data of the user terminal from the source secondary base station to the target secondary base station via the master base station.

In the fourth aspect, the communication control method further includes: transmitting, from the master base station to the source secondary base station, a first swap request for swapping the secondary base station; transmitting, to the target secondary base station from the source secondary base station that has received the first swap request, a second swap request for swapping the secondary base station; configuring, by the target secondary base station that has received the second swap request, radio resources for the user terminal in response to receive the second swap request; and transmitting, from the target secondary base station to the master base station, resource configuration information for the user terminal.

In the fourth aspect, the communication control method further includes: transmitting, from the source secondary base station to the target secondary base station, a swap request for swapping the secondary base station; configuring, by the target secondary base station that has received the swap request, a radio resource for the user terminal upon reception of the swap request; and transmitting, from the target secondary base station to the master base station, resource configuration information for the user terminal.

In the fourth aspect, in transmitting the establishment configuration information, the master base station transmits the establishment configuration information in response to receive the resource configuration information from the target secondary base station, to the user terminal.

In the fourth aspect, the communication control method further includes: performing, by the user terminal that has received the establishment configuration information, a random access to the target secondary base station on the basis of the establishment configuration information; and transmitting, to the master base station from the target secondary base station that has detected synchronization with the user terminal, a swap completion notification indicating swap completion of the secondary base station.

A master base station according to a fifth aspect performs, with a user terminal, communication of a dual connectivity scheme together with a secondary base station. The master base station includes a transmitter configured to transmit, to the user terminal, establishment configuration information to add configurations for a connection between a target secondary base station and the user terminal when the secondary base station is switched from a source secondary base station to the target secondary base station after starting communication of the dual connectivity scheme.

A user terminal according to a sixth aspect performs communication of a dual connectivity scheme with a master base station and a secondary base station. The user terminal includes a receiver configured to receive, from the master base station, establishment configuration information to add configurations for a connection between a target secondary base station and the user terminal when the secondary base station is switched from a source secondary base station to the target secondary base station after starting communication of the dual connectivity scheme.

A communication control method according to a seventh aspect is a method in a mobile communication system that supports a dual connectivity scheme using: a master base station that establishes an RRC connection with user terminal, and a secondary base station that provides the user terminal with additional radio resources. The communication control method includes performing, by a communication control apparatus, a determination related to the dual connectivity scheme on the basis of whether a serving gateway that accommodates the master base station and a serving gateway that accommodates the secondary base station coincide with each other.

In the seventh aspect, the communication control method further includes transmitting, from the master base station and/or the secondary base station to the communication control apparatus, identification information of a serving gateway that accommodates own base station.

In the seventh aspect, the dual connectivity scheme includes a first dual connectivity scheme that establishes a data path between each of the master base station and the secondary base station and one serving gateway. In the performing the determination, the communication control apparatus determines not to apply the first dual connectivity scheme when the serving gateway that accommodates the master base station and the serving gateway that accommodates the secondary base station do not coincide with each other.

A master base station according to an eighth aspect performs, with a user terminal, communication of a dual connectivity scheme together with a secondary base station. The master base station includes a transmitter configured to transmit, to the secondary base station via an X2 interface, a request message requesting a resource preparation or a resource modification for the dual connectivity scheme for the user terminal. The transmitter transmits the request message including identification information of a serving gateway connected with the master base station via an S1 interface.

In the eighth aspect, the identification information is an S1 tunnel endpoint ID (S1-TEID) of the serving gateway.

In the eighth aspect, the identification information is an IP address of the serving gateway.

A secondary base station according to a ninth aspect performs, with a user terminal, communication of a dual connectivity scheme together with a master base station. The secondary base station includes a receiver configured to receive, from the master base station via an X2 interface, a request message requesting a resource preparation or a resource modification for the dual connectivity scheme for the user terminal. The receiver receives the request message including identification information of a serving gateway connected with the master base station via an S1 interface.

DESCRIPTION OF EMBODIMENTS

[Overview of Embodiments]

Figure 1:
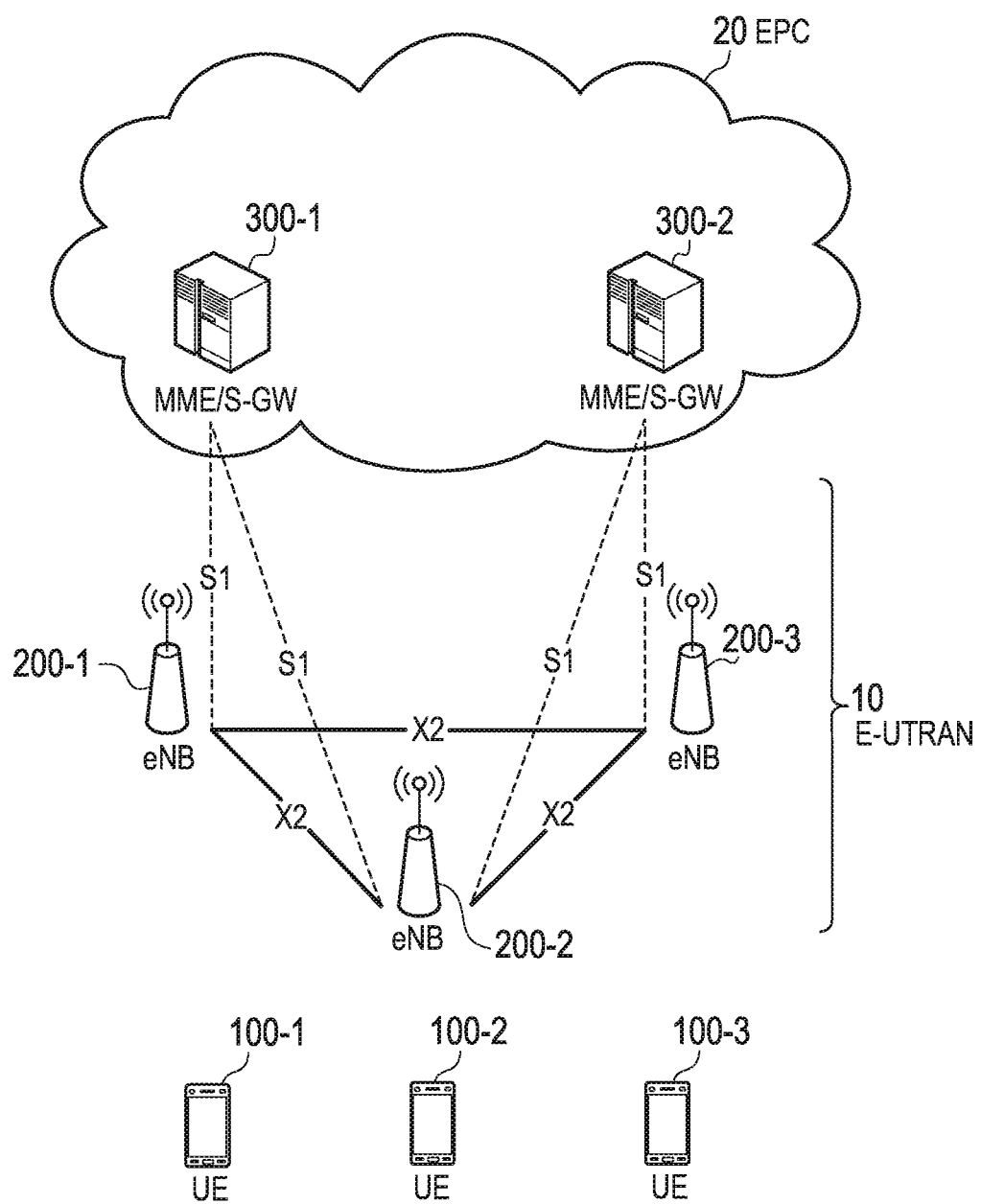
FIG. 1 is a configuration diagram of an LTE system according to first to third embodiments.

A communication control method according to a first embodiment is a method in a mobile communication system that supports a dual connectivity scheme, in which a master base station that establishes an RRC connection with user terminal, and a secondary base station that provides the user terminal with additional radio resources are used. The method includes a step of transmitting, from a source master base station to the user terminal, a handover command for instructing handover, when the handover of the user terminal from the source master base station to a target master base station is performed after communication in the dual connectivity scheme is started. In the step of transmitting the handover command, the source master base station transmits secondary base station information about configurations of the secondary base station with the handover command, to the user terminal.

In the first embodiment, the communication control method, in the step of transmitting the handover command, the source master base station transmits one RRC reconfiguration message including the handover command and the secondary base station information, to the user terminal.

In an operation pattern 1 according to the first embodiment, the secondary base station information is information for configuring a release of a connection between the secondary base station and the user terminal.

In the operation pattern 1 according to the first embodiment, the communication control method further includes a step of establishing, by the user terminal that has received the secondary base station information with the handover command, a new RRC connection with the target master base station in response to the handover command while releasing the connection with the secondary base station in accordance with the secondary base station information.

In the operation pattern 1 according to the first embodiment, the communication control method further includes a step of determining, by the source master base station, whether to release the connection between the secondary base station and the user terminal, when the handover is determined, or when a handover acknowledgement is received from the target master base station.

In the operation pattern 1 according to the first embodiment, the communication control method further includes a step of transmitting, from the target master base station to a core network, a path switch request for collectively switching a data path between the source master base station and the core network, and a data path between the secondary base station and the core network to the target master base station.

In an operation pattern 2 according to the first embodiment, the secondary base station information is information for configuring maintenance of the connection between the secondary base station and the user terminal.

In the operation pattern 2 according to the first embodiment, the communication control method further includes a step of establishing, by the user terminal that has received the secondary base station information with the handover command, a new RRC connection with the target master base station in response to the handover command while maintaining the connection with the secondary base station in accordance with the secondary base station information.

In the operation pattern 2 according to the first embodiment, the communication control method further includes a step of transmitting, from the source master base station to the target master base station, information indicating that the handover is performed while maintaining the connection between the secondary base station and the user terminal.

In the operation pattern 2 according to the first embodiment, the communication control method further includes a step of transmitting, from the source master base station to the secondary base station, information indicating that the master base station corresponding to the user terminal is switched from the source master base station to the target master base station.

In a third embodiment, the communication control method further includes a step of determining whether to perform the handover after releasing the connection between the secondary base station and the user terminal or to perform the handover while maintaining the connection between the secondary base station and the user terminal, on the basis of whether a dual connectivity scheme using a data path architecture in which a data path between the secondary base station and the core network passes through the master base station is applicable.

In the third embodiment, the communication control method further includes a step of determining whether to perform the handover after releasing the connection between the secondary base station and the user terminal or to perform the handover while maintaining the connection between the secondary base station and the user terminal, on the basis of whether a serving gateway that accommodates the target master base station and a serving gateway that accommodates the secondary base station coincide with each other.

A communication control method according to a second embodiment is a method in a mobile communication system that supports a dual connectivity scheme, in which a master base station that establishes an RRC connection with user terminal, and a secondary base station that provides the user terminal with additional radio resources are used. The method includes a step of transmitting, from the master base station to the user terminal, establishment configuration information for configuring establishment of a connection between a target secondary base station and the user terminal, when the secondary base station is switched from a source secondary base station to the target secondary base station after communication in the dual connectivity scheme is started.

In the second embodiment, in the step of transmitting the establishment configuration information, the master base station transmits, to the user terminal, release configuration information for configuring a release of the connection between the source secondary base station and the user terminal with the establishment configuration information.

In the second embodiment, in the step of transmitting the release configuration information, the master base station transmits one RRC reconfiguration message including the release configuration information and the establishment configuration information, to the user terminal.

In an operation pattern 1 according to the second embodiment, the master base station transmits the establishment configuration information to the user terminal, after a secondary base station release process between the master base station and the source secondary base station, and a secondary base station addition process between the master base station and the target secondary base station are completed.

In the operation pattern 1 according to the second embodiment, the master base station performs at least a part of the secondary base station release process and at least a part of the secondary base station addition process in parallel.

In an operation pattern 2 according to the second embodiment, the communication control method further includes steps of: transmitting, from the master base station to the source secondary base station, a first swap request for swapping the secondary base station; transmitting, to the target secondary base station from the source secondary base station that has received the first swap request, a second swap request for swapping the secondary base station; configuring, by the target secondary base station that has received the second swap request, radio resources for the user terminal upon reception of the second swap request; and transmitting, from the target secondary base station to the master base station, resource configuration information for the user terminal.

In an operation pattern 3 according to the second embodiment, the communication control method further includes steps of: transmitting, from the source secondary base station to the target secondary base station, a swap request for swapping the secondary base station; configuring, by the target secondary base station that has received the swap request, a radio resource for the user terminal upon reception of the swap request; and transmitting, from the target secondary base station to the master base station, resource configuration information for the user terminal.

In the operation patterns 2 and 3 according to the second embodiment, in the step of transmitting the establishment configuration information, the master base station transmits the establishment configuration information upon reception of the resource configuration information from the target secondary base station, to the user terminal.

In the operation patterns 2 and 3 according to the second embodiment, the communication control method further includes steps of: performing, by the user terminal that has received the establishment configuration information, a random access to the target secondary base station on the basis of the establishment configuration information; and transmitting, to the master base station from the target secondary base station that has detected synchronization with the user terminal, a swap completion notification indicating swap completion of the secondary base station.

A communication control method according to a third embodiment is a method in a mobile communication system that supports a dual connectivity scheme, in which a master base station that establishes an RRC connection with user terminal, and a secondary base station that provides the user terminal with additional radio resources are used. The method includes a step of performing, by a communication control apparatus, a determination related to the dual connectivity scheme on the basis of whether a serving gateway that accommodates the master base station and a serving gateway that accommodates the secondary base station coincide with each other.

In the third embodiment, the communication control method further includes a step of transmitting, from the master base station and/or the secondary base station to the communication control apparatus, identification information of a serving gateway that accommodates own base station.

In the third embodiment, the dual connectivity scheme includes a first dual connectivity scheme that establishes a data path between each of the master base station and the secondary base station and one serving gateway. In the step of performing the determination, the communication control apparatus determines not to apply the first dual connectivity scheme when the serving gateway that accommodates the master base station and the serving gateway that accommodates the secondary base station do not coincide with each other.

[First Embodiment]

Hereinafter, an embodiment in which the present disclosure is applied to an LTE system is described.

(System Configuration)

FIG. 1 is a configuration diagram of an LTE system according to a first embodiment.

As illustrated in FIG. 1, the LTE system according to the first embodiment is provided with UE (User terminal) 100, E-UTRAN (Evolved-UMTS Terrestrial Radio Access Network) 10, and EPC (Evolved Packet Core) 20.

The UE 100 corresponds to a user terminal. The UE 100 is a mobile communication device that performs radio communication with a cell (a serving cell). A configuration of the UE 100 is described later.

The E-UTRAN 10 corresponds to a radio access network. The E-UTRAN 10 includes an eNB 200 (evolved Node-B). The eNB 200 corresponds to a base station. The eNBs 200 are mutually connected via X2 interfaces. A configuration of the eNB 200 is described later.

The eNB 200 manages one or a plurality of cells, and performs radio communication with the UE 100 that has established connection with its cell. The eNB 200 has a radio resource manage (RRM) function, a user data routing function, a measurement control function for mobility control and scheduling, and other functions. The term "cell" not only means the minimum unit of a radio communication area, but means a function to perform radio communication with the UE 100.

The EPC 20 corresponds to a core network. The EPC 20 includes an MME (Mobility Management Entity)/S-GW (Serving-Gateway) 300. The MME performs, for example, various types of mobility control to the UE 100. The S-GW performs transfer control of user data. The MME/S-GW 300 is connected to the eNB 200 via an S1 interface.

Figure 2:
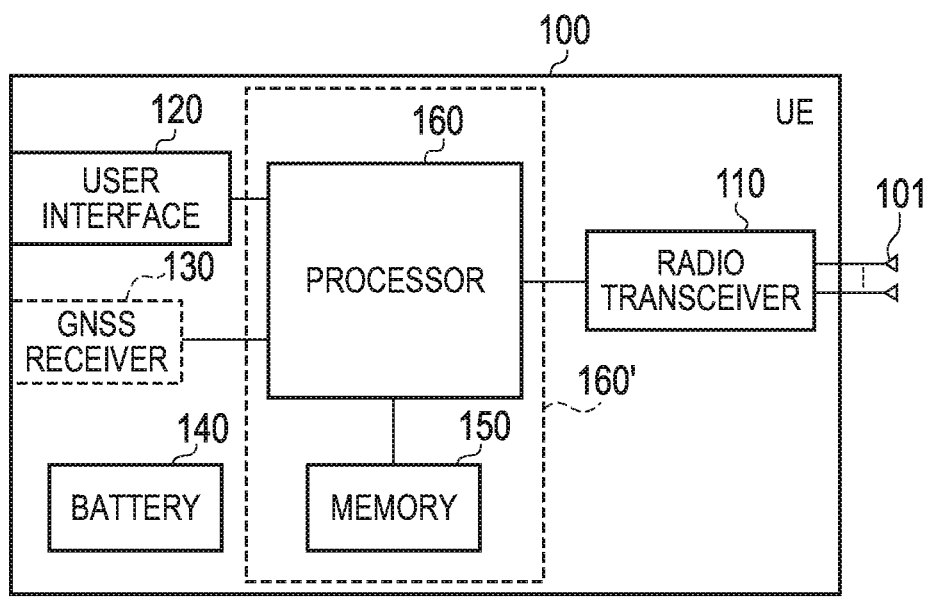
FIG. 2 is a block diagram of UE according to the first to the third embodiments.

FIG. 2 is a block diagram of the UE 100. As illustrated in FIG. 2, the UE 100 is provided with a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 does not necessarily have to be provided with the GNSS receiver 130. The memory 150 may be integrated with the processor 160 and the integrated memory 150 and the processor 160 (i.e., a chip set) may be used as a processor 160'.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. The radio transceiver 110 converts the radio signal received by the antenna 101 into a baseband signal (a received signal) and outputs the baseband signal to the processor 160.

The user interface 120 is an interface with a user who possesses the UE 100 and is provided with, for example, a display, a microphone, speaker, and various buttons. The user interface 120 receives an operation from the user, and outputs a signal indicating the content of the operation to the processor 160. To obtain location information indicating a geographical position of the UE 100, the GNSS receiver 130 receives a GNSS signal and outputs the received signal to the processor 160. The battery 140 accumulates power that is supplied to each block of the UE 100.

The memory 150 stores a program executed by the processor 160, and information used for the process by the processor 160. The processor 160 includes a baseband processor that performs, for example, modulation/demodulation and encoding/decoding of the baseband signal, and a CPU (central processing unit) that executes the program stored in the memory 150 to perform various processes. The processor 160 may further include a codec that performs encoding/decoding of an audio/visual signals. The processor 160 performs various processes and various communication protocols described later.

Figure 3:
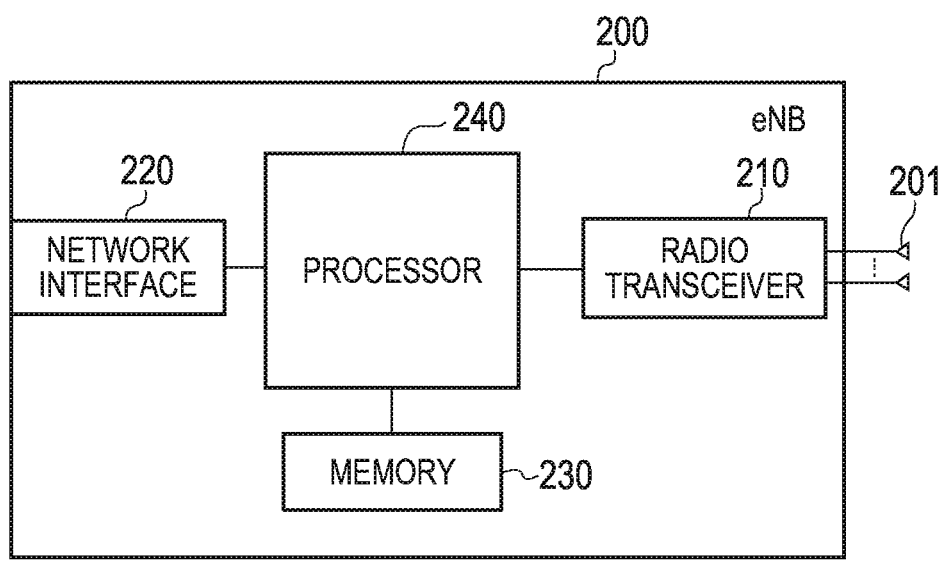
FIG. 3 is a block diagram of an eNB according to the first to the third embodiments.

FIG. 3 is a block diagram of the eNB 200. As illustrated in FIG. 3, the eNB 200 is provided with a plurality of antennas 201, a radio transceiver 210, a network interface 220, a memory 230, and a processor 240. The memory 230 and the processor 240 constitute a controller. The memory 230 may be integrated with the processor 240 and the integrated memory 230 and the processor 240 (i.e., a chip set) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. The radio transceiver 210 converts the radio signal received by the antenna 201 into a baseband signal (a received signal) and outputs the baseband signal to the processor 240.

The network interface 220 is connected to a neighboring eNB 200 via an X2 interface, and connected to the MME/S-GW 300 via the S1 interface. The network interface 220 is used for the communication performed on the X2 interface and the communication performed on the S1 interface.

The memory 230 stores a program executed by the processor 240 and information used for the process by the processor 240. The processor 240 includes a baseband processor that performs, for example, modulation/demodulation and encoding/decoding of the baseband signal, and a CPU that executes the program stored in the memory 230 to perform various processes. The processor 240 performs various processes and various communication protocols described later.

Figure 4:
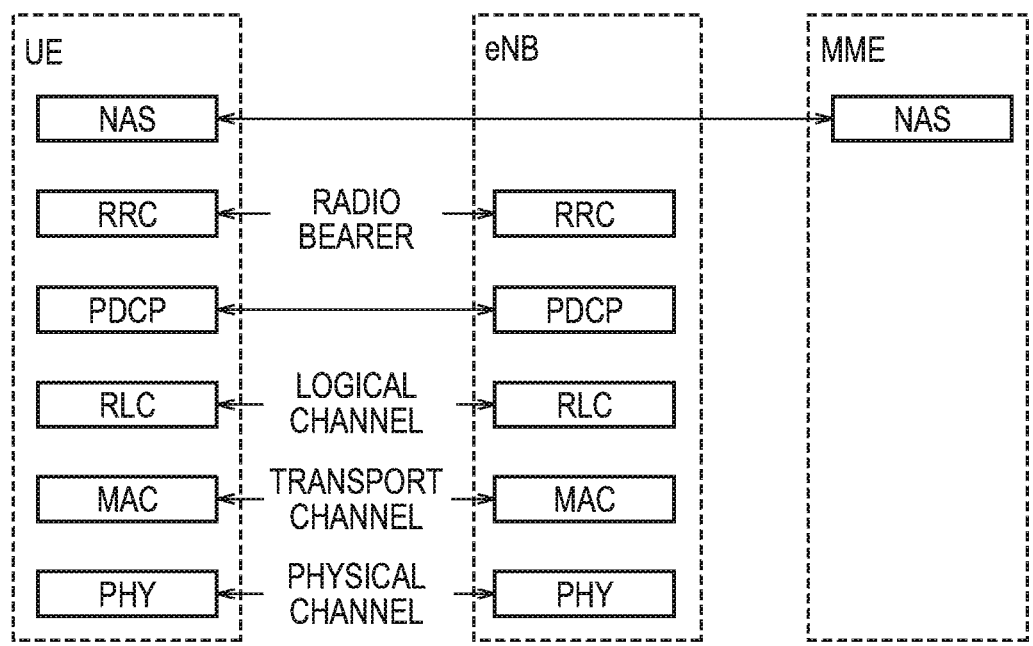
FIG. 4 is a protocol stack diagram of a radio interface according to the first to the third embodiments.

FIG. 4 is a protocol stack diagram of a wireless interface in the LTE system. As illustrated in FIG. 4, a radio interface protocol is divided into first to third layers of an OSI reference model. The first layer is a physical (PHY) layer. The second layer includes an MAC (Medium Access Control) layer, an RLC (Radio Link Control) layer, and a PDCP (Packet Data Convergence Protocol) layer. The third layer includes an RRC (Radio Resource Control) layer.

The physical layer performs encoding/decoding, modulation/demodulation, antenna mapping/demapping, and resource mapping/demapping. Between the physical layer of the UE 100 and the physical layer of the eNB 200, the user data and the control signal are transmitted via a physical channel.

The MAC layer performs, for example, preferential control of data, a retransmission process by hybrid ARQ (HARQ), and a random access sequence at the time of establishment of the RRC connection. Between the MAC layer of the UE 100 and the MAC layer of the eNB 200, the user data and the control signal are transmitted via a transport channel. The MAC layer of the eNB 200 includes a scheduler that determines a transport format (a transport block size, and a modulation/encoding method) of an uplink and a downlink, and determines an assignment resource block to the UE 100.

The RLC layer transmits data to the RLC layer on the reception side using the function of the MAC layer and the physical layer. Between the RLC layer of the UE 100 and the RLC layer of the eNB 200, the user data and the control signal are transmitted via a logical channel.

The PDCP layer performs header compression/decompression, and encoding/decoding.

The RRC layer is defined only by a control plane that deals with the control signal. Between the RRC layer of the UE 100 and the RRC layer of the eNB 200, control signals (RRC messages) for various configurations are transmitted. The RRC layer controls a logical channel, a transport channel, and a physical channel in accordance with establishment, reestablishment, and a release of a radio bearer. When a connection (RRC connection) is established between the RRC of the UE 100 and the RRC of the eNB 200, the UE 100 is in an RRC connected state, and when no connection is established, the UE 100 is in an RRC idle state.

An NAS (Non-Access Stratum) layer located above the RRC layer performs, for example, session management and mobility management.

(Dual Connectivity Scheme)

The LTE system according to the first embodiment supports the dual connectivity scheme. Introduction of the dual connectivity scheme is planned in Release 12 or thereafter. In the dual connectivity scheme, the UE 100 establishes connections with a plurality of eNBs 200 simultaneously. Since radio resources are assigned to the UE 100 from each eNB 200, an improvement in throughput is expected. The dual connectivity scheme may be referred also to as inter-eNB 200 carrier aggregation (inter-eNB CA).

Figure 5:
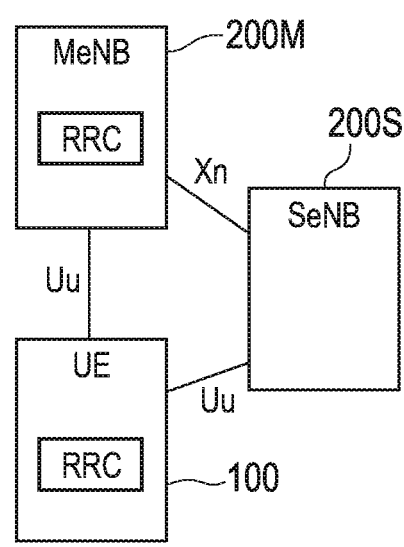
FIG. 5 is a diagram illustrating an overview of a dual connectivity scheme.

FIG. 5 is a diagram illustrating an overview of the dual connectivity scheme.

As illustrated in FIG. 5, in the dual connectivity scheme, only a master eNB (MeNB) 200M establishes an RRC connection with the UE 100 among a plurality of eNBs 200 that establish connections with the UE 100. On the other hand, a secondary eNB (SeNB) 200S among the plurality of eNBs 200 does not establish an RRC connection with the UE 100 but provides the UE 100 with additional radio resources. In other words, the MeNB 200M establishes not only a user plane connection but a control plane connection with the UE 100. On the other hand, the SeNB 200S establishes a user plane connection with the UE 100, and does not establish a control plane connection with the UE 100. An Xn interface is set between the MeNB 200M and the SeNB 200S. The Xn interface is an X2 interface or a new interface.

In the dual connectivity scheme, the UE 100 may perform carrier aggregation that uses N cells managed by the MeNB 200M and M cells managed by the SeNB 200S simultaneously. In the dual connectivity scheme, the maximum number of the serving cells of the UE 100, i.e., the maximum number of (N+M), is, for example, 5. Here, a group consisting of N cells managed by the MeNB 200M is referred to as a master cell group (MCG). A group consisting of M cells managed by the SeNB 200S is referred to as a secondary cell group (SCG). A special cell in which a PUCCH of the UE 100 is provided is configured in the SCG. The special cell performs a part of a function of a primary cell (PCell) in the carrier aggregation.

FIGS. 6 and 7 are diagrams illustrating a configuration system of a transfer path (data path) of user data in the dual connectivity scheme. Mainly, there are two kinds of user plane architectures (UP architectures) that configure the transfer path (data path) of the user data in the dual connectivity scheme.

Figure 6A:
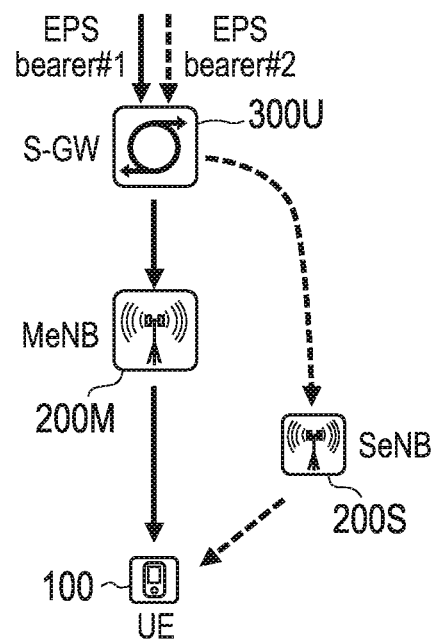
FIG. 6A is a diagram illustrating a data path configuration for a first UP architecture (a UP architecture "1A").
Figure 6B:
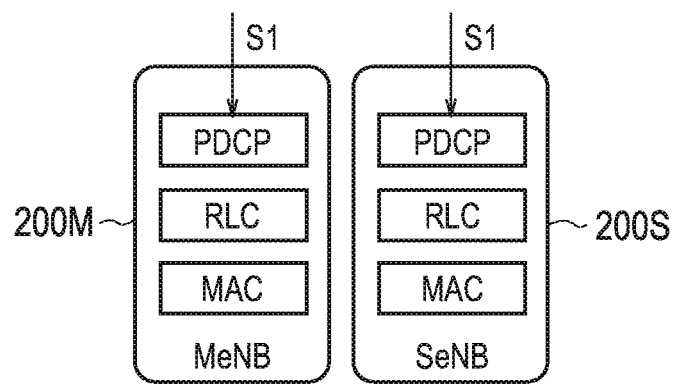
FIG. 6B is a diagram illustrating a protocol stack configuration for the first UP architecture.

FIG. 6 illustrates a first UP architecture (referred also to as a UP architecture "1A"). As illustrated in FIG. 6A, in the first UP architecture, an S1-U interface between the MeNB 200M and an S-GW 300U, and an S1-U interface between the SeNB 200S and the S-GW 300U are used. An EPS bearer #1 between the UE 100 and a P-GW goes via the S1-U interface between the MeNB 200M and the S-GW 300U. An EPS bearer #2 between the UE 100 and the P-GW goes via the S1-U interface between the SeNB 200S and the S-GW 300U. Thus, in the first UP architecture, the data path between the SeNB 200S and the S-GW 300U does not go via the MeNB 200M. As illustrated in FIG. 6B, each of the MeNB 200M and the SeNB 200S processes each layer of PDCP, RLC, and MAC.

Figure 7A:
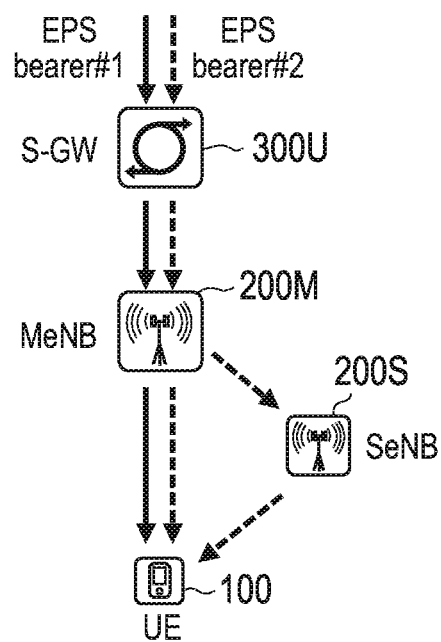
FIG. 7A is a diagram illustrating a data path configuration for a second UP architecture (a UP architecture "3C").
Figure 7B:
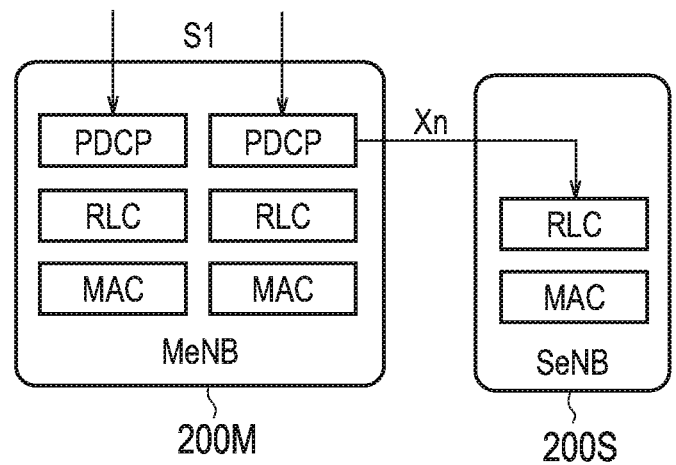
FIG. 7B is a diagram illustrating a protocol stack configuration for the second UP architecture.

FIG. 7 illustrates a second UP architecture (referred also to as a UP architecture "3C"). As illustrated in FIG. 7A, in the second UP architecture, the EPS bearer #2 between the UE 100 and the P-GW is split at the MeNB 200M. One split bearer terminates at the UE 100 via the SeNB 200S and another split bearer terminates at the UE 100 not via the SeNB 200S. Thus, in the second UP architecture, the data path between the SeNB 200S and the S-GW 300U goes via the MeNB 200M. As illustrated in FIG. 7B, regarding one split bearer of the EPS bearer #2, processing of each layer is performed by the PDCP of the MeNB 200M, and the RLC and the MAC of the SeNB 200S. Regarding the split bearer, the MeNB 200M may perform the processing until the RLC (or a part of the function of the RLC).

(Operation According to First Embodiment)

(1) Operation Scenario

In the first embodiment, a scenario in which the master cell is a macro cell and a secondary cell is a cell (small cell) having a coverage narrower than that of the macro cell is mainly considered. Here, the small cell is, for example, a picocell or a femtocell that has a coverage overlapping at least a part of the coverage of the macro cell. By configuring a cell of wider coverage as the master cell, a movement of the UE 100 in the RRC connected state can be followed, i.e., mobility is improved.

Figure 8:
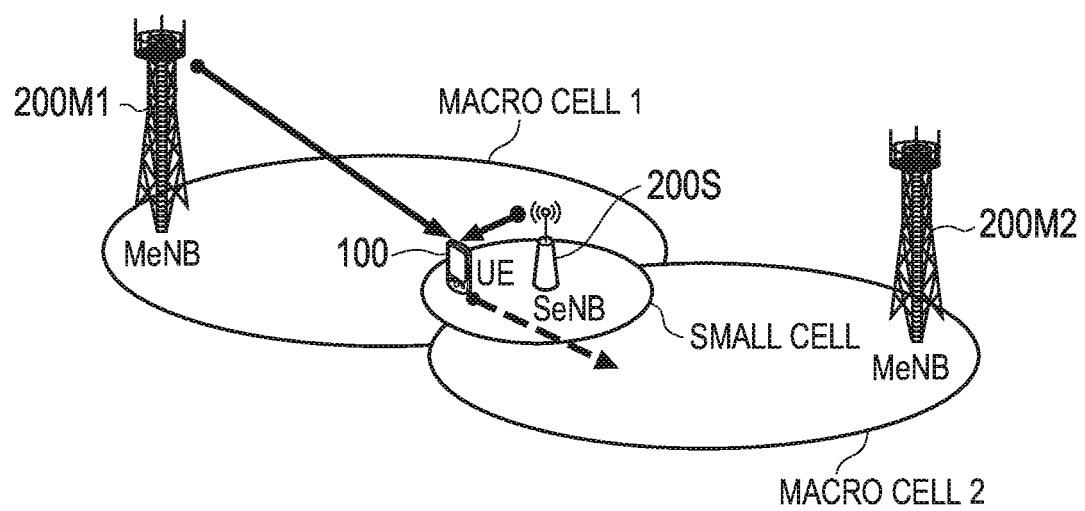
FIG. 8 is a diagram illustrating an operating environment according to the first embodiment.

FIG. 8 is a diagram illustrating an operating environment according to the first embodiment.

As illustrated in FIG. 8, the UE 100 is located in an overlapping area of the coverage of the macro cell 1 and the coverage of the small cell, and communicates in the dual connectivity scheme in combination of the macro cell 1 (MeNB 200M1) and the small cell (SeNB 200S). The small cell is located near a boundary of two macro cells 1 and 2. The UE 100 moves toward the macro cell 2 (MeNB 200M2). Therefore, handover of the UE 100 from the MeNB 200M1 (source) to the MeNB 200M2 (target) is needed. Hereafter, the MeNB 200M1 is referred to as a source MeNB (S-MeNB), and the MeNB 200M2 is referred to as a target MeNB (T-MeNB).

Figure 9:
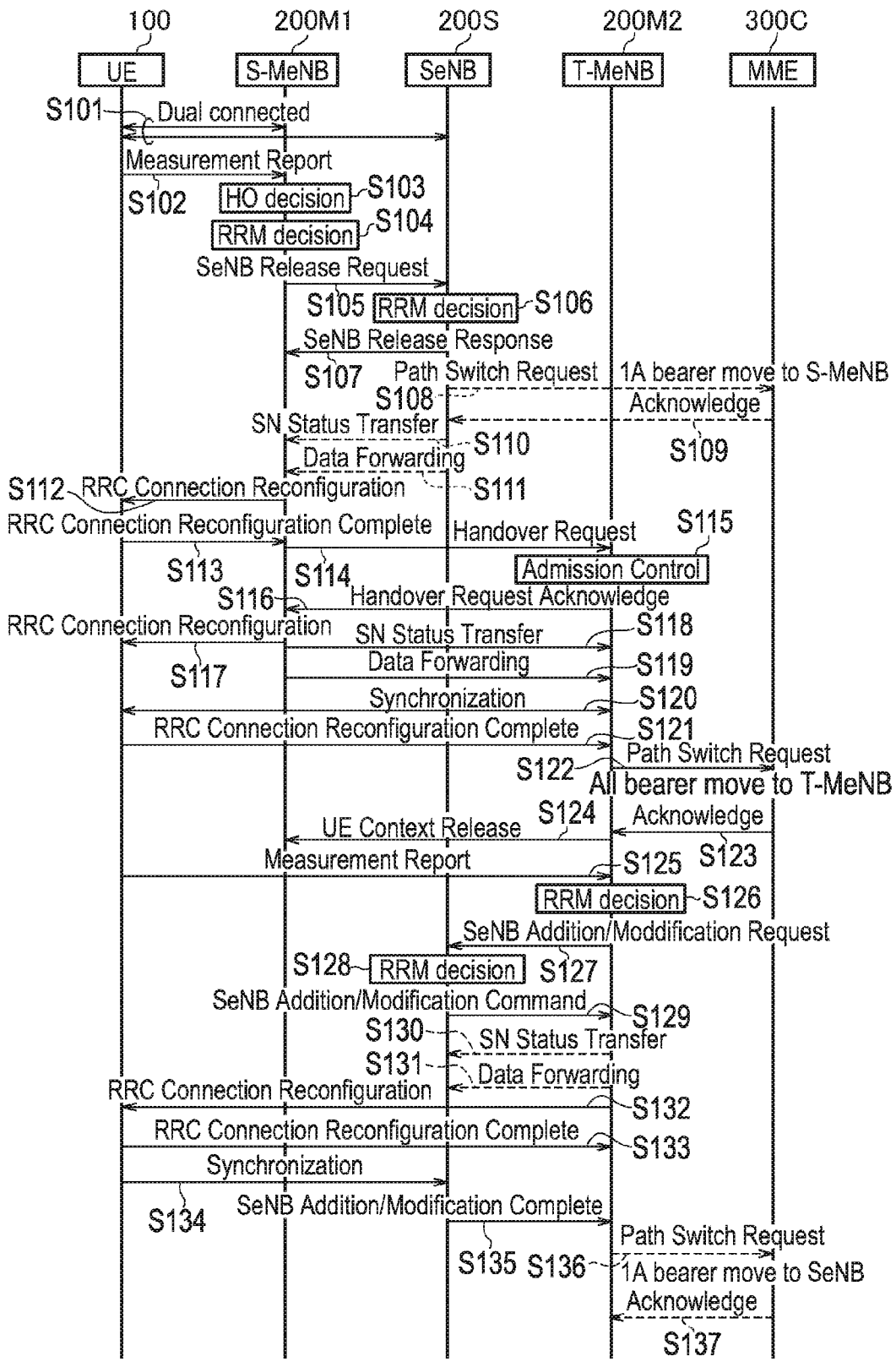
FIG. 9 is a sequence diagram illustrating a basic sequence.

FIG. 9 is a sequence diagram illustrating a basic sequence in the case of performing handover of the UE 100 from the S-MeNB 200M1 to the T-MeNB 200M2. In an initial state of FIG. 9, the UE 100 performs communication in the dual connectivity scheme with the S-MeNB 200M1 and SeNB 200S (S101).

As illustrated in FIG. 9, in the basic sequence, after the S-MeNB 200M1 determines handover of the UE 100 to the T-MeNB 200M2 (S103) on the basis of, for example, a measurement report received from the UE 100 (S102), the following three procedures are performed. First, a release procedure of the SeNB 200S (S104 to S113) is performed. Second, a handover procedure from the S-MeNB 200M1 to the T-MeNB 200M2 (S114 to S124) is performed. Third, an addition procedure of the SeNB 200S (S125 to S137) is performed.

In particular, in step S103, the S-MeNB 200M1 determines handover of the UE 100 to the T-MeNB 200M2. In step S104, the S-MeNB 200M1 determines a release of the SeNB resource corresponding to the UE 100. In step S105, the S-MeNB 200M1 transmits, to the SeNB 200S, a release request (SeNB Release Request) of the SeNB resource corresponding to the UE 100. In step S106, the SeNB 200S releases the SeNB resource in response to the release request. In step S107, the SeNB 200S transmits a response to the release request (SeNB Release Response) to the T-MeNB 200M2.

In the first UP architecture, in step S108, the SeNB 200S transmits, to the MME 300C, a switch request (Path Switch Request) for moving the bearer from the SeNB 200S to the S-MeNB 200M1. In step S109, the MME 300C transmits an acknowledgement to the switch request to the SeNB 200S. In steps S110 and S111, the SeNB 200S performs a data transfer process of the UE 100 to the S-MeNB 200M1.

In step S112, the S-MeNB 200M1 transmits, to the UE 100, an RRC reconfiguration message (RRC Connection Reconfiguration) for releasing the SeNB 200S. The UE 100 releases the configuration related to the SeNB 200S. In step S113, the UE 100 transmits, to the S-MeNB 200M1, a completion notification of RRC reconfiguration (RRC Connection Reconfiguration Complete).

In step S114, the S-MeNB 200M1 transmits a handover request to the T-MeNB 200M2. In step S115, the T-MeNB 200M2 determines whether to acknowledge the handover request. In step S116, the T-MeNB 200M2 transmits, to the S-MeNB 200M1, an acknowledgement to the handover request (Handover Request Acknowledge).

In step S117, the S-MeNB 200M1 transmits, to the UE 100, the RRC reconfiguration message for the handover. In steps S118 and S119, the SeNB 200S performs a data transfer process of the UE 100 to the T-MeNB 200M2.

In step S120, the UE 100 performs a random access to the T-MeNB 200M2 on the basis of the RRC reconfiguration message, and synchronizes with the T-MeNB 200M2. In step S121, the UE 100 transmits the completion notification of the RRC reconfiguration to the T-MeNB 200M2.

In step S122, the T-MeNB 200M2 transmits, to the MME 300C, the switch request for moving the data path from the S-MeNB 200M1 to the T-MeNB 200M2. In step S123, the MME 300C transmits an acknowledgement to the switch request to the SeNB 200S. In step S124, the T-MeNB 200M2 transmits the release request of a UE context to the S-MeNB 200M1.

In step S125, the UE 100 transmits a measurement report to the T-MeNB 200M2. In step S126, the T-MeNB 200M2 determines addition of the SeNB resource on the basis of, for example, the measurement report.

In step S127, the T-MeNB 200M2 transmits, to the SeNB 200S, an assignment request of the SeNB resource (SeNB Addition/Modification Request). In step S128, the SeNB 200S performs a radio resource configuration, when the SeNB 200S acknowledges the request. In step S129, the SeNB 200S transmits, to the T-MeNB 200M2, a report of the radio resource configuration (SeNB Addition/Modification-Command).

In the first UP architecture, in steps S130 and S131, the T-MeNB 200M2 performs the data transfer process of the UE 100 to the SeNB 200S.

In step S132, the T-MeNB 200M2 transmits, to the UE 100, the RRC reconfiguration message for the addition of the SeNB 200S. The UE 100 starts application of the radio resource configuration of the SeNB 200S. In step S133, the UE 100 transmits, to the T-MeNB 200M2, a completion notification of the RRC reconfiguration (RRC Connection Reconfiguration Complete).

In step S134, the UE 100 performs a random access to the SeNB 200S on the basis of the RRC reconfiguration message, and synchronizes with the SeNB 200S. In step S135, the SeNB 200S that has detected synchronization with the UE 100 transmits, to the T-MeNB 200M2, a notification that the use of the radio resource configuration has been enabled (SeNB Addition/Modification Complete).

In the first UP architecture, in step S136, the T-MeNB 200M2 transmits, to the MME 300C, a switch request for moving the bearer from the S-MeNB 200M1 to the SeNB 200S. In step S137, the MME 300C transmits, to the SeNB 200S, an acknowledgement to the switch request.

Thus, in the basic sequence, an RRC reconfiguration (RRC Connection Reconfiguration) to the UE 100 is performed in each of the release procedure of the SeNB 200S, the handover procedure, and the addition procedure of the SeNB 200S. First, in the release procedure of the SeNB 200S, the RRC reconfiguration for the release of the SeNB 200S is performed (S112). Second, in the handover procedure from the S-MeNB 200M1 to the T-MeNB 200M2, the RRC reconfiguration for the handover is performed (S117). Third, in the addition procedure of the SeNB 200S, the RRC reconfiguration for the addition of the SeNB 200S is performed (S132). Thus, it is considered that the RRC reconfiguration is performed three times in the handover between MeNBs 200M in the dual connectivity scheme. Therefore, signaling in a radio segment increases and, at the same time, RLF-HOF (handover failure) increases as processing time related to the handover increases.

Further, signaling with the core network may occur in each of the release procedure of the SeNB 200S, the handover procedure, and the addition procedure of the SeNB 200S. First, in the release procedure of the SeNB 200S, in the first UP architecture described above, signaling for moving the bearer from the SeNB 200S to the S-MeNB 200M1 (S108, S109) occurs. Second, in the handover procedure from the S-MeNB 200M1 to the T-MeNB 200M2, signaling for switching the data path from the S-MeNB 200M1 to the T-MeNB 200M2 (S122, S123) occurs. Third, in the addition procedure of the SeNB 200S, in the first UP architecture, signaling for moving the bearer from the S-MeNB 200M1 to the SeNB 200S (S136, S137) occurs. Thus, it is considered that signaling with the core network occurs three times at the maximum in the handover between MeNBs 200M in the dual connectivity scheme. Therefore, an increase in the signaling in the network segment becomes a problem.

In the first embodiment, the increase in signaling described above can be controlled by improving the sequence of the handover between MeNBs 200M in the dual connectivity scheme. An improved handover sequence is described below.

(2) Operation Pattern 1

Figure 10:
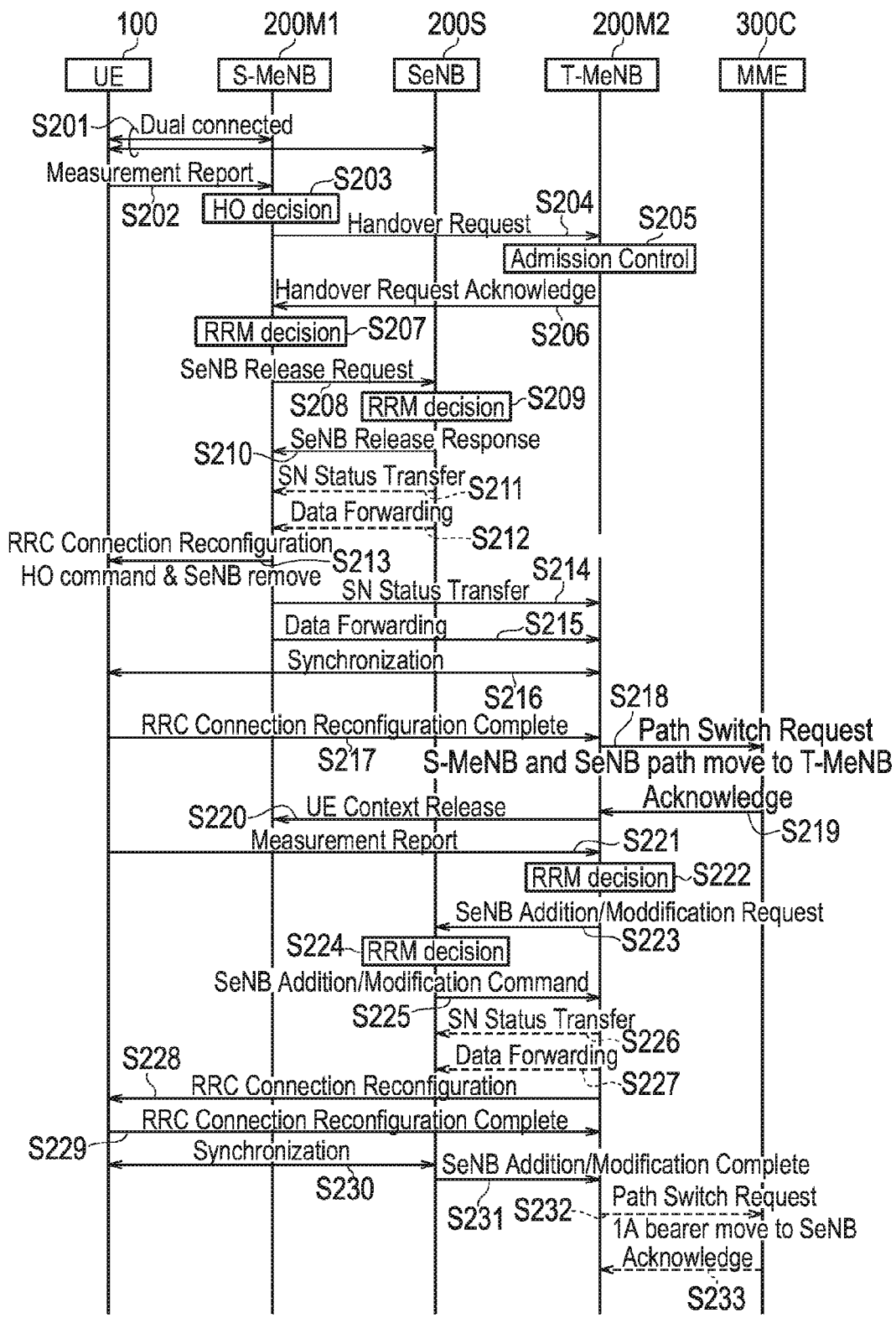
FIG. 10 is a sequence diagram illustrating an operation pattern 1 according to the first embodiment.

FIG. 10 is a sequence diagram illustrating an operation pattern 1 according to the first embodiment. Hereinafter, differences with the basic sequence are described mainly. In an initial state of FIG. 11, the UE 100 performs communication in the dual connectivity scheme with the S-MeNB 200M1 and SeNB 200S (S201).

As illustrated in FIG. 10, in step S203, the S-MeNB 200M1 determines handover of the UE 100 to the T-MeNB 200M2 on the basis of, for example, the measurement report received from the UE 100 (S202). In the operation pattern 1, the S-MeNB 200M1 may determine whether to release the connection between the SeNB 200S and the UE 100 at the time of determination of the handover.

In step S204, the S-MeNB 200M1 transmits a handover request to the T-MeNB 200M2. In step S205, the T-MeNB 200M2 determines whether to acknowledge the handover request. In step S206, the T-MeNB 200M2 transmits an acknowledgement to the handover request (Handover Request Acknowledge) to the S-MeNB 200M1. The T-MeNB 200M2 includes, in the handover acknowledgement, an RRC container for which the SeNB configuration is not performed. The S-MeNB 200M1 may determine whether to release the connection between the SeNB 200S and the UE 100 at the time of reception of the handover acknowledgement from the T-MeNB 200M2.

Next, the S-MeNB 200M1 and the SeNB 200S perform the release procedure of the SeNB 200S (steps S207 to S212). The release procedure is the same as that of the basic sequence.

In step S213, the S-MeNB 200M1 transmits, to the UE 100, the RRC reconfiguration message including a handover command for instructing handover.

In the operation pattern 1, the S-MeNB 200M1 transmits, to the UE 100, information for configuring the release of the connection between the SeNB 200S and the UE 100 (SeNB remove) with the handover command. The SeNB remove corresponds to secondary base station information about the configuration of the SeNB 200S. It is desirable that the S-MeNB 200M1 transmits, to the UE 100, one RRC reconfiguration message including the handover command and the SeNB remove. Therefore, since the RRC reconfiguration message only for the release of the SeNB 200S becomes unnecessary, the RRC reconfiguration can be reduced by once as compared with the basic sequence. The UE 100 that has received SeNB information with the handover command releases the connection with the SeNB 200S in response to the SeNB remove, synchronizes with the T-MeNB 200M2 in response to the handover command (S216), and establishes a new RRC connection (S217).

In the operation pattern 1, the T-MeNB 200M2 transmits, to the MME 300C, a path switch request (S218) for switching the data path between the S-MeNB 200M1 and the S-GW 300U and the data path (bearer) between the SeNB 200S and the S-GW 300U to the T-MeNB 200M2 collectively. It is desirable that information about the bearer of the S-MeNB 200M1 is included in the handover request (S204) described above or other messages. Thus, the T-MeNB 200M2 can specify a bearer to be switched using the bearer information included in the handover request.

In response to the path switch request, the MME 300C performs path switching for switching the data path between the S-MeNB 200M1 and the S-GW 300U, and the data path (bearer) between the SeNB 200S and the S-GW 300U to the T-MeNB 200M2 collectively. Thus, signaling for moving the bearer from the SeNB 200S to the S-MeNB 200M1 in the first UP architecture becomes unnecessary.

The addition procedure of the SeNB 200S (steps S211 to S233) is the same as that of the basic sequence.

(3) Operation Pattern 2

Figure 11:
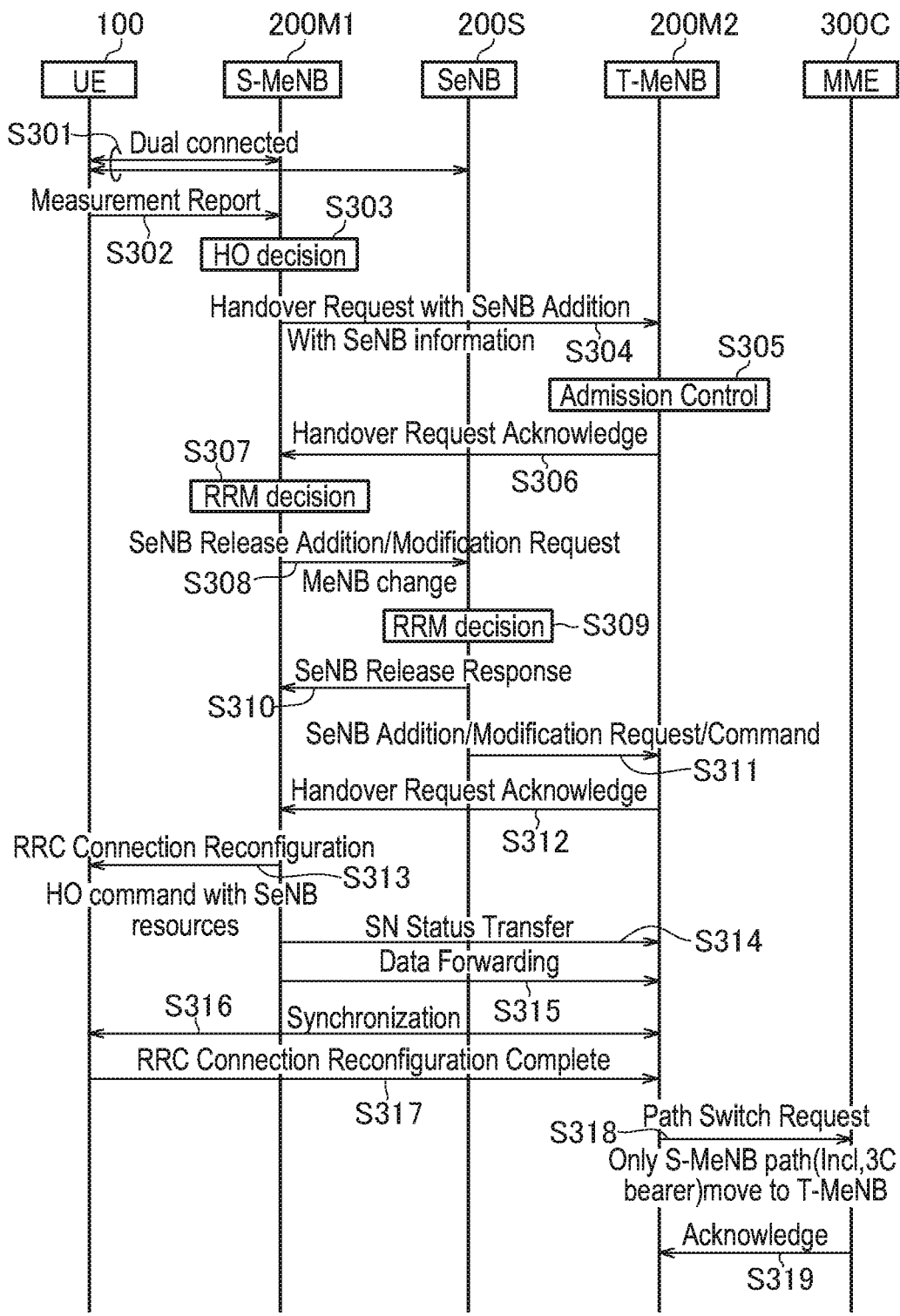
FIG. 11 is a sequence diagram illustrating an operation pattern 2 according to the first embodiment.

FIG. 11 is a sequence diagram illustrating an operation pattern 2 according to the first embodiment. In an initial state of FIG. 11, the UE 100 performs communication in the dual connectivity scheme with the S-MeNB 200M1 and the SeNB 200S (S301).

As illustrated in FIG. 11, in step S303, the S-MeNB 200M1 determines handover of the UE 100 to the T-MeNB 200M2 on the basis of, for example, the measurement report received from the UE 100 (S302). The S-MeNB 200M1 determines whether to release the connection between the SeNB 200S and the UE 100 at the time of determination of the handover. In the operation pattern 2, the S-MeNB 200M1 can determine handover while maintaining the SeNB 200S (DC HO: Dual Connectivity HandOver). The next operation is performed after determining handover while maintaining the SeNB 200S.

In step S304, the S-MeNB 200M1 transmits a handover request to the T-MeNB 200M2. At that time, the S-MeNB 200M1 includes, in the handover request, information indicating that handover is performed while maintaining the connection between the SeNB 200S and the UE 100 (SeNB Information). The SeNB Information includes information about the SeNB 200S (e.g., an eNB ID and a cell ID). The SeNB Information may also include an element included in SeNB Addition/Modification (e.g., UE capabilities and the radio resource configuration of the UE). The S-MeNB 200M1 may hold the RRC container received from the SeNB 200S at the time of SeNB Addition before the present sequence, and may include the RRC container in the handover request. The RRC container may be used in, for example, step S311 described later.

In step S305, the T-MeNB 200M2 determines to acknowledge the handover request. Here, when the information related to SeNB Addition is included in the handover request (i.e., the information indicating DC HO), the T-MeNB 200M2 may make a determination including acknowledgement of the SeNB Addition.

If acknowledgment (acceptance) is possible, in step S306, the T-MeNB 200M2 transmits the handover acknowledgement to the S-MeNB 200M1. The handover acknowledgement in step S306 may be a normal handover acknowledgement, and the handover acknowledgement may be omitted when the handover acknowledgement is transmitted in step S312 described later. Alternatively, the handover acknowledgement in step S306 may be a simplified normal handover acknowledgement (e.g., a flag indicating that HO is acknowledged temporarily). Alternatively, the handover acknowledgement in step S306 may include information indicating that "since the resource is insufficient, the HO requires addition of the SeNB resource" (which may be used in step S307 described later) may be included.

In step S307, the S-MeNB 200M1 that has received the handover acknowledgement determines to maintain the SeNB resource. In step S308, the S-MeNB 200M1 transmits, to SeNB 200S, a request for modifying and switching the MeNB (SeNB Release Addition/Modification Request). The S-MeNB 200M1 includes information indicating that the SeNB switches to the T-MeNB 200M2 (MeNB change) in the request. The MeNB change includes information about the T-MeNB 200M2 (e.g., an eNB ID and a cell). When SeNB related configuration information is included in the handover request in step S304 (i.e., it is already a state in which the T-MeNB can configure the SeNB), step S308 may be mere Release (however, information related to MeNB change is transmitted).

In step S309, the SeNB 200S releases and changes the radio resource when the SeNB 200S acknowledges the request from the S-MeNB 200M1. In step S310, the SeNB 200S transmits, to the S-MeNB 200M1, a response to the release and change request (SeNB Release Response).

In step S311, on the basis of the MeNB change received from the S-MeNB 200M1, the SeNB 200S transmits a notification of the radio resource configuration (SeNB Addition/Modification Request/Command) to the T-MeNB 200M2. When the SeNB related configuration information is included in the handover request in step S304 (i.e., it is already a state in which the T-MeNB can configure the SeNB) the notification in step S311 may be in reverse direction or may be omitted.

In step S312, the T-MeNB 200M2 transmits, to the S-MeNB 200M1, a handover acknowledgement including the radio resource configuration of the SeNB (SeNB resource). Alternatively, the T-MeNB 200M2 may include the SeNB resource configuration in other messages, and transmit to the S-MeNB 200M1.

In step S313, the S-MeNB 200M1 transmits, to the UE 100, the RRC reconfiguration message including the SeNB resource configuration from the T-MeNB 200M2, and the handover command. The SeNB resource configuration corresponds to the information for configuring the maintenance of the connection between the SeNB 200S and the UE 100.

The UE 100 starts application of the SeNB resource configuration. Here, since the UE 100 is in synchronization with the SeNB 200S, the random access (synchronization) with the SeNB 200S may be omitted. Further, information indicating omission of the random access (synchronization) may be included in the RRC reconfiguration message.

In steps S314 and S315, the SeNB 200S performs a data transfer process of the UE 100 to the T-MeNB 200M2.

In step S316, the UE 100 performs a random access to the T-MeNB 200M2 on the basis of the RRC reconfiguration message, and synchronizes with the T-MeNB 200M2. In step S317, the UE 100 transmits the completion notification of the RRC reconfiguration to the T-MeNB 200M2.

In step S318, the T-MeNB 200M2 transmits, to the MME 300C, the path switch request for switching the data path between the S-MeNB 200M1 and the S-GW 300U to the T-MeNB 200M2. In the operation pattern 2, since the SeNB 200S is maintained, the bearer switching of the SeNB 200S does not occur even in the first UP architecture.

Thus, in the operation pattern 2, signaling can be reduced significantly by performing the handover between the MeNBs 200M while maintaining the SeNB 200S as compared with the basic sequence.

In the operation pattern 2, the handover acknowledgement is transmitted from the T-MeNB 200M2 to the S-MeNB 200M1 twice (S306, S312), but the handover acknowledgement may be transmitted only once (S312).

Second Embodiment

Hereinafter, regarding a second embodiment, differences from the first embodiment are described mainly.

(1) Operation Scenario

Figure 12:
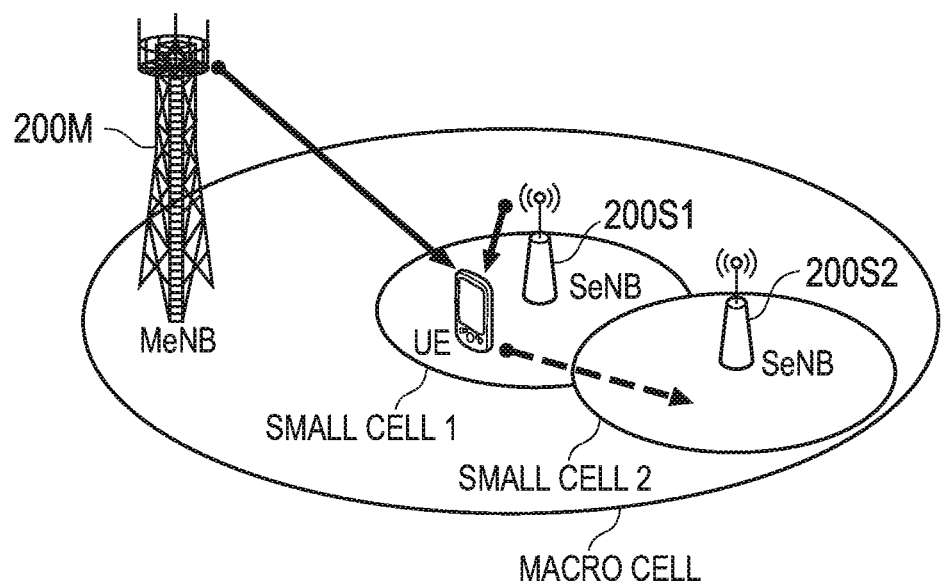
FIG. 12 is a diagram illustrating an operating environment according to the second embodiment.

FIG. 12 is a diagram illustrating an operating environment according to the second embodiment.

As illustrated in FIG. 12, in the second embodiment, a plurality of small cells 1 and 2 are provided in one macro cell. The UE 100 is located in an overlapping area of a coverage of a macro cell and a coverage of a small cell 1, and communicates in a dual connectivity scheme in combination of the macro cell (MeNB 200M) and the small cell 1 (SeNB 200S1). The UE 100 moves toward the small cell 2 (SeNB 200S2). In the second embodiment, the SeNB corresponding to the UE 100 is switched from an S-SeNB 200S1 to a T-SeNB 200S2. Hereafter, the SeNB 200S1 is referred to as a source SeNB (S-SeNB), and the SeNB 200S2 is referred to as a target SeNB (T-SeNB).

(1) Operation Pattern 1

Figure 13:
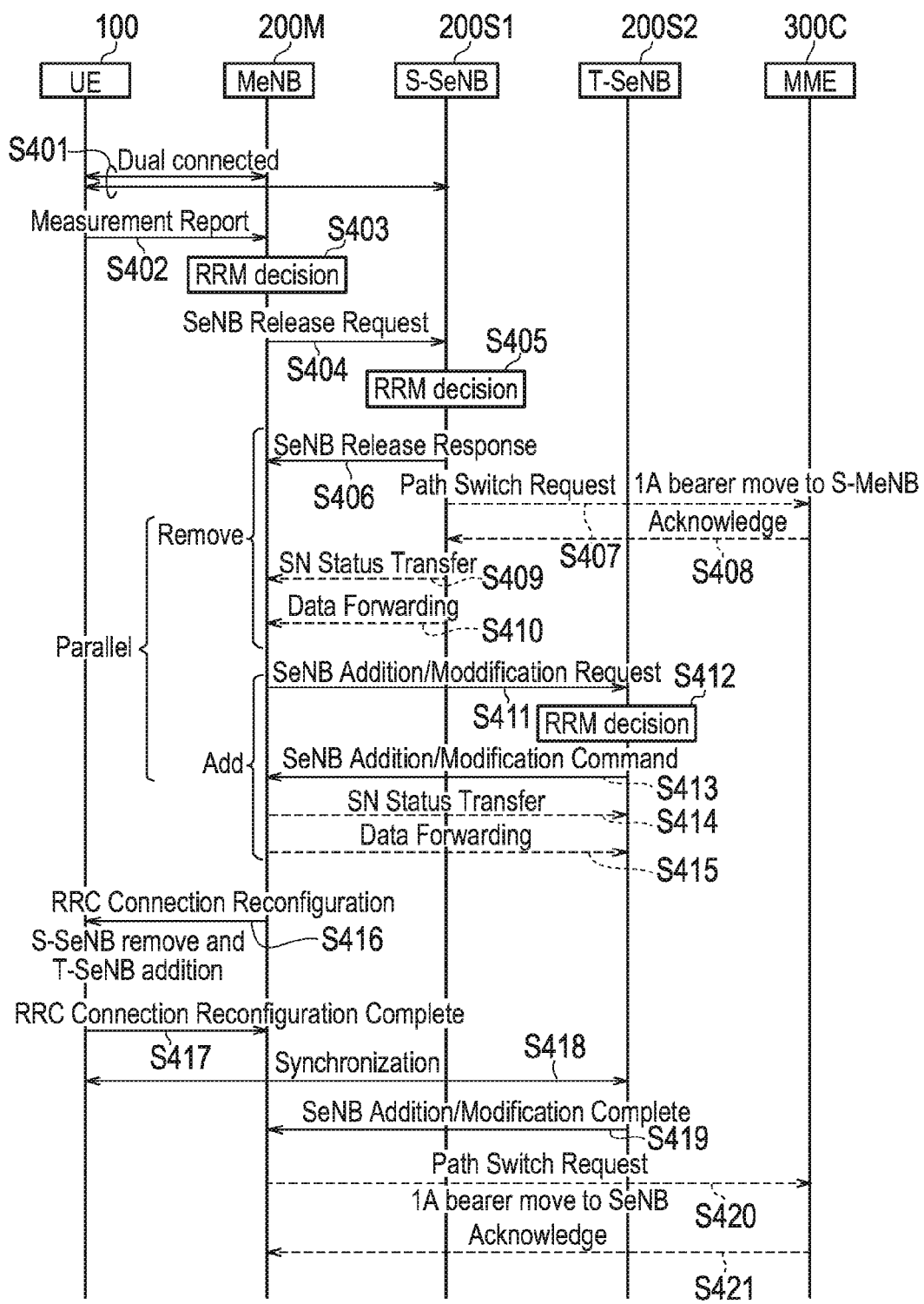
FIG. 13 is a sequence diagram illustrating an operation pattern 1 according to the second embodiment.

FIG. 13 is a sequence diagram illustrating an operation pattern 1 according to the second embodiment. In an initial state of FIG. 13, the UE 100 performs communication in the dual connectivity scheme with the MeNB 200M and the S-SeNB 200S1 (S401).

As illustrated in FIG. 13, in step S402, the UE 100 transmits a measurement report to the MeNB 200M. In step S403, the MeNB 200M determines a release and an assignment of the SeNB resource corresponding to the UE 100 on the basis of, for example, the measurement report. In the operation pattern 1, the release of the SeNB resource (Remove) and assignment (Add) may be performed in parallel. That is, the MeNB 200M performs at least a part of the SeNB release process (Remove) and at least a part of an SeNB addition process (Add) in parallel.

In step S404, the MeNB 200M transmits, to the S-SeNB 200S1, a release request of the SeNB resource corresponding to the UE 100. In step S405, the S-SeNB 200S1 releases the SeNB resource in response to the release request. In step S406, the S-SeNB 200S1 transmits, to the MeNB 200M, a response to the release request (SeNB Release Response).

In the first UP architecture, in step S407, the S-SeNB 200S1 transmits, to the MME 300C, a switch request for moving the bearer from the S-SeNB 200S1 to the MeNB 200M. In step S408, the MME 300C transmits an acknowledgement to the switch request to the S-SeNB 200S1. In steps S409 and S410, the S-SeNB 200S1 performs a data transfer process of the UE 100 to the MeNB 200M.

In step S411, the MeNB 200M transmits an assignment request of the SeNB resource to a T-SeMB 200S2. In step S412, the T-SeMB 200S2 performs a radio resource configuration, when the T-SeMB 200S2 acknowledges the request. In step S413, the T-SeMB 200S2 transmits a notification of the radio resource configuration to the MeNB 200M.

In the first UP architecture, in steps S414 and S415, the MeNB 200M performs the data transfer process of the UE 100 to the T-SeMB 200S2.

In step S416, the MeNB 200M transmits, to the UE 100, an RRC reconfiguration message including establishment configuration information for configuring establishment of a connection between the T-SeNB 200S2 and the UE 100 (T-SeNB addition). The T-SeNB addition includes radio resource configuration of the T-SeMB 200S2. The MeNB 200M may further include, in the RRC reconfiguration message, release configuration information for configuring the release of the connection between the S-SeNB 200S1 and the UE 100 (S-SeNB remove).

Thus, in the operation pattern 1, the MeNB 200M transmits, to the UE 100, establishment configuration information (T-SeNB addition) after the SeNB release process between the MeNB 200M and the S-SeNB 200S1, and the SeNB addition process between the MeNB 200M and the T-SeNB 200S2 are completed.

In step S418, the UE 100 performs a random access to the T-SeMB 200S2 on the basis of the RRC reconfiguration message, synchronizes with the T-SeMB 200S2. In step S419, the T-SeMB 200S2 that has detected synchronization with the UE 100 transmits, to the MeNB 200M, a notification that the use of the radio resource configuration has been enabled.

In the first UP architecture, in step S420, the MeNB 200M transmits, to the MME 300C, a switch request for moving the bearer from the MeNB 200M to the T-SeMB 200S2. In step S421, the MME 300C transmits an acknowledgement to the switch request to the MeNB 200M.

(2) Operation Pattern 2

Figure 14:
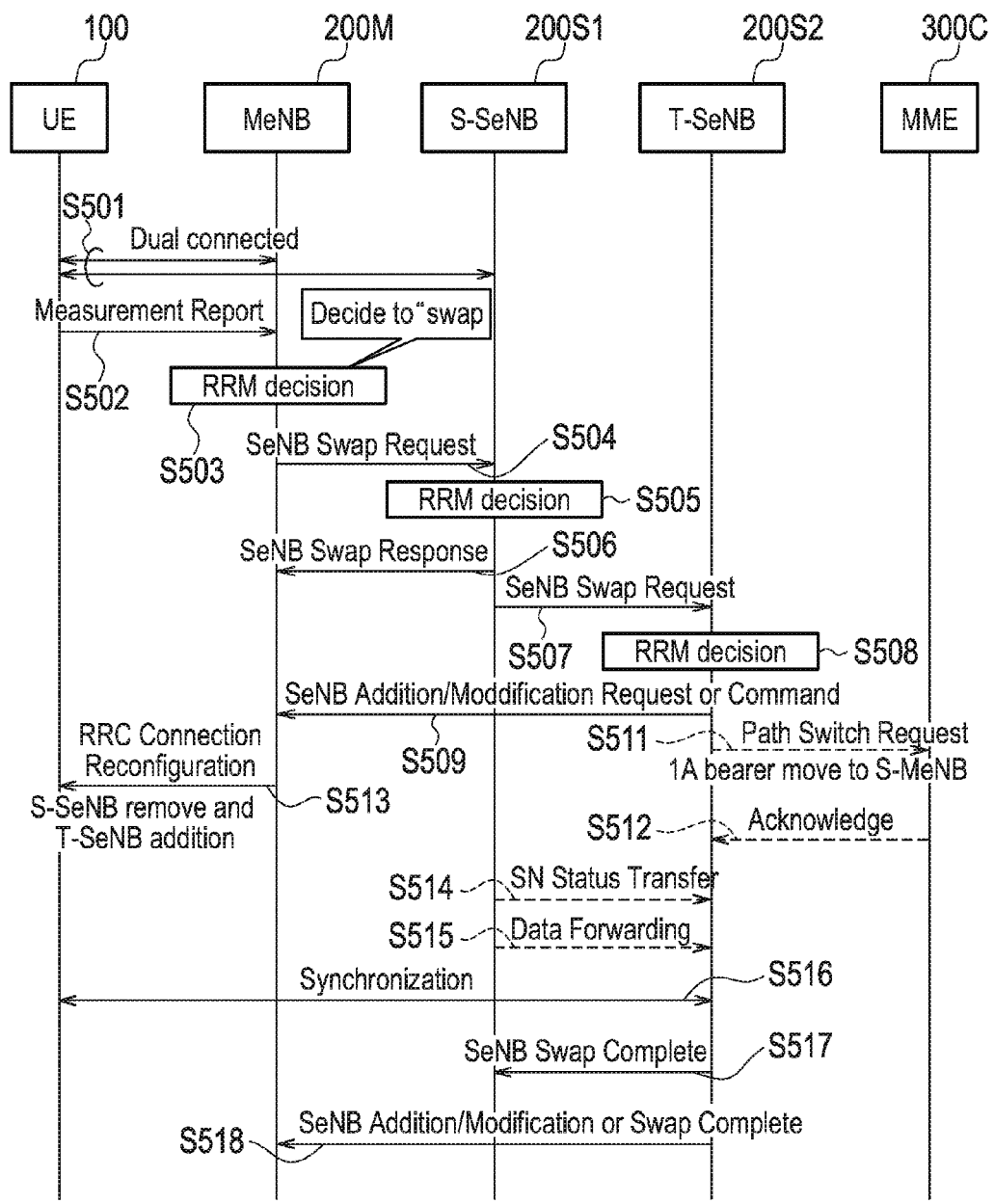
FIG. 14 is a sequence diagram illustrating an operation pattern 2 according to the second embodiment.

FIG. 14 is a sequence diagram illustrating an operation pattern 2 according to the second embodiment. In an initial state of FIG. 14, the UE 100 performs communication in the dual connectivity scheme with the MeNB 200M and the S-SeNB 200S1 (S501).

As illustrated in FIG. 14, in step S502, the UE 100 transmits a measurement report to the MeNB 200M. In step S503, the MeNB 200M determines a swap of the SeNB resource from the S-SeNB 200S1 to the T-SeMB 200S2 on the basis of, for example, the measurement report.

In step S504, the MeNB 200M transmits, to the S-SeNB 200S1, a first swap request for swapping the SeNB (SeNB Swap Request). The first swap request requests a release of the S-SeNB 200S1 and addition of the T-SeNB 200S2. The first swap request includes information about the T-SeNB 200S2 (an eNB ID and a cell ID) and information about the MeNB 200M (an eNBID and a cell ID).

In step S505, the S-SeNB 200S1 releases the SeNB resource in response to the first swap request. In step S506, the S-SeNB 200S1 transmits, to the MeNB 200M, a response to the first swap request (SeNB Swap Response).

In step S507, the S-SeNB 200S1 transmits, to the T-SeNB 200S2, a second swap request for swapping the SeNB (SeNB Swap Request). The second swap request requests addition of the T-SeNB 200S2. The second swap request includes information about the MeNB 200M (an eNB ID and a cell ID).

In step S508, the T-SeNB 200S2 that has received the second swap request configures the SeNB resource (radio resource) for the UE 100. In step S509, the T-SeNB 200S2 transmits, to the MeNB 200M, a report of the SeNB resource configuration (SeNB Addition/Modification Command).

In the first UP architecture, in step S511, the T-SeNB 200S2 transmits, to the MME 300C, a switch request for moving the bearer from the S-SeNB 200S1 to the T-SeMB 200S2. In step S512, the MME 300C transmits, to the T-SeMB 200S2, an acknowledgement to the switch request. In steps S514 and S515, the S-SeNB 200S1 performs the data transfer of the UE 100 to the T-SeMB 200S2.

On the other hand, in step S513, the MeNB 200M that has received the report of the SeNB resource configuration from the T-SeMB 200S2 transmits, to the UE 100, an RRC reconfiguration message including establishment configuration information for configuring establishment of a connection between the T-SeNB 200S2 and the UE 100 (T-SeNB addition). The T-SeNB addition includes a radio resource configuration of the T-SeMB 200S2 (resource configuration information). The MeNB 200M may further include, in the RRC reconfiguration message, release configuration information for configuring the release of the connection between the S-SeNB 200S1 and the UE 100 (S-SeNB remove).

In step S516, the UE 100 performs a random access to the T-SeMB 200S2 on the basis of the RRC reconfiguration message, synchronizes with the T-SeMB 200S2. In steps S517 and S518, the T-SeMB 200S2 that has detected synchronization with the UE 100 transmits, to the MeNB 200M, a swap completion notification (Swap Complete) that the use of the radio resource configuration has been enabled.

(3) Operation Pattern 3

Figure 15:
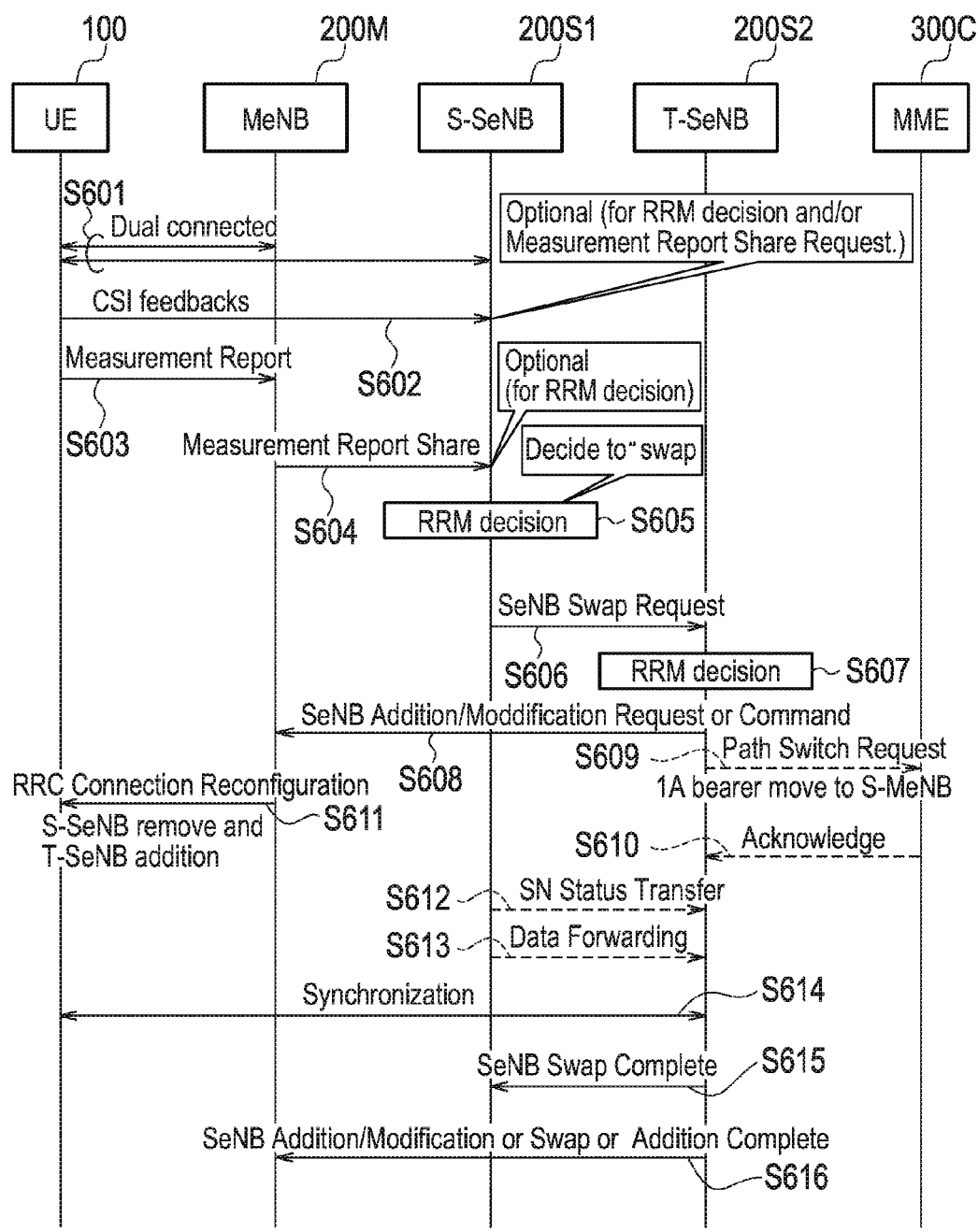
FIG. 15 is a sequence diagram illustrating an operation pattern 3 according to the second embodiment.

FIG. 15 is a sequence diagram illustrating an operation pattern 3 according to the second embodiment. In an initial state of FIG. 15, the UE 100 performs communication in the dual connectivity scheme with the MeNB 200M and the S-SeNB 20051 (S601). Here, differences from the operation pattern 2 are mainly described.

As illustrated in FIG. 15, in step S602, the UE 100 may transmit channel state information (CSI) to the S-SeNB 200S1.

In step S603, the UE 100 transmits a measurement report to the MeNB 200M. In step S604, the MeNB 200M may transmit the measurement report received from the UE 100 to the S-SeNB 200S1.

In step S605, the S-SeNB 200S1 determines the swap of the SeNB resource from the S-SeNB 200S1 to the T-SeMB 200S2 on the basis of, for example, the measurement report and the CSI. The S-SeNB 200S1 may negotiate with the MeNB 200M about its own "release." The S-SeNB 200S1 releases the SeNB resource.

In step S606, the S-SeNB 200S1 transmits a swap request for swapping the SeNB (SeNB Swap Request) to the T-SeNB 200S2. The swap request requests addition of the T-SeNB 200S2. The swap request includes information about the MeNB 200M (an eNB ID and a cell ID).

In step S607, the T-SeNB 200S2 that has received the swap request configures the SeNB resource (radio resource) for the UE 100. In step S608, the T-SeNB 200S2 transmits a report of the SeNB resource configuration (SeNB Addition/Modification Command) to the MeNB 200M. Subsequent operations (S609 to S616) are the same as those of the operation pattern 2.

Third Embodiment

Hereinafter, regarding a third embodiment, differences from the first and the second embodiments are described mainly.

(1) Operation Scenario

Figure 16:
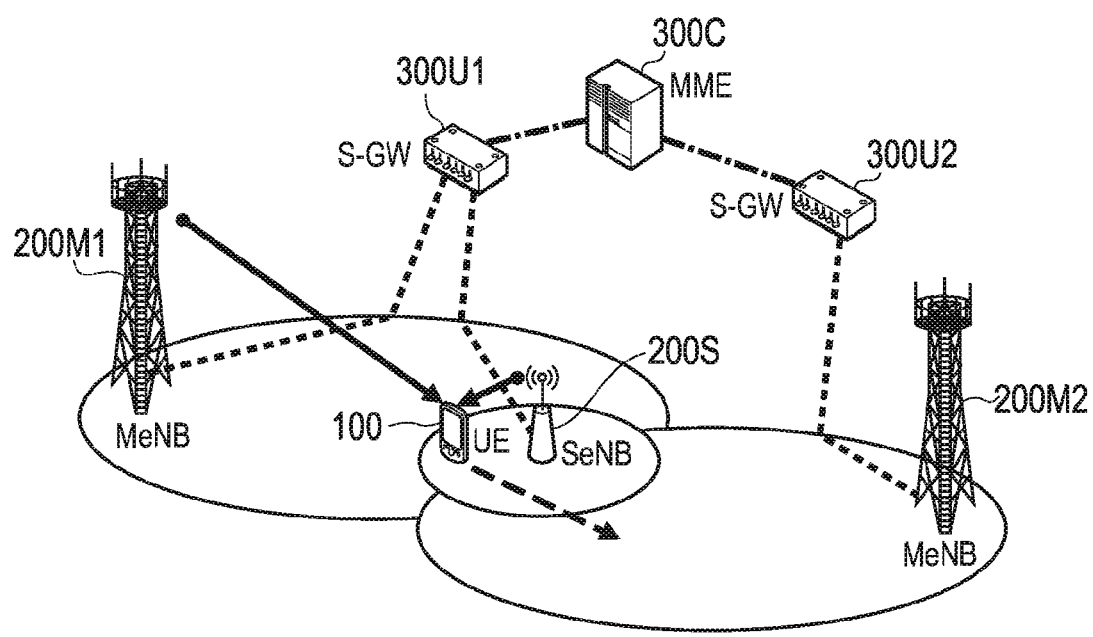
FIG. 16 is a diagram illustrating an operation scenario 1 according to the third embodiment.

FIG. 16 is a diagram illustrating an operation scenario 1 according to the third embodiment.

As illustrated in FIG. 16, in the operation scenario 1 according to the third embodiment, a configuration of an EPC 20 in the operation scenario according to the first embodiment is also considered. In the example of FIG. 16, the MeNB 200M1 and the SeNB 200S are contained in the same S-GW 300U1, and the MeNB 200M1 is contained in a different S-GW 300U2. That is, each of the MeNB 200M1 and the SeNB 200S has an S1 interface between itself and the S-GW 300U1. The MeNB 200M2 has an S1 interface between itself and the S-GW 300U2.

In this scenario, the first UP architecture is inapplicable to the SeNB 200S and the MeNB 200M2, but the second UP architecture is applicable to the SeNB 200S and the MeNB 200M2. In this scenario, on the presumption that the first UP architecture is applied, enhanced handover control in which handover between the MeNBs 200M is performed while the SeNB 200S is maintained as, for example, in the operation pattern 2 according to the first embodiment cannot be performed.

Figure 17:
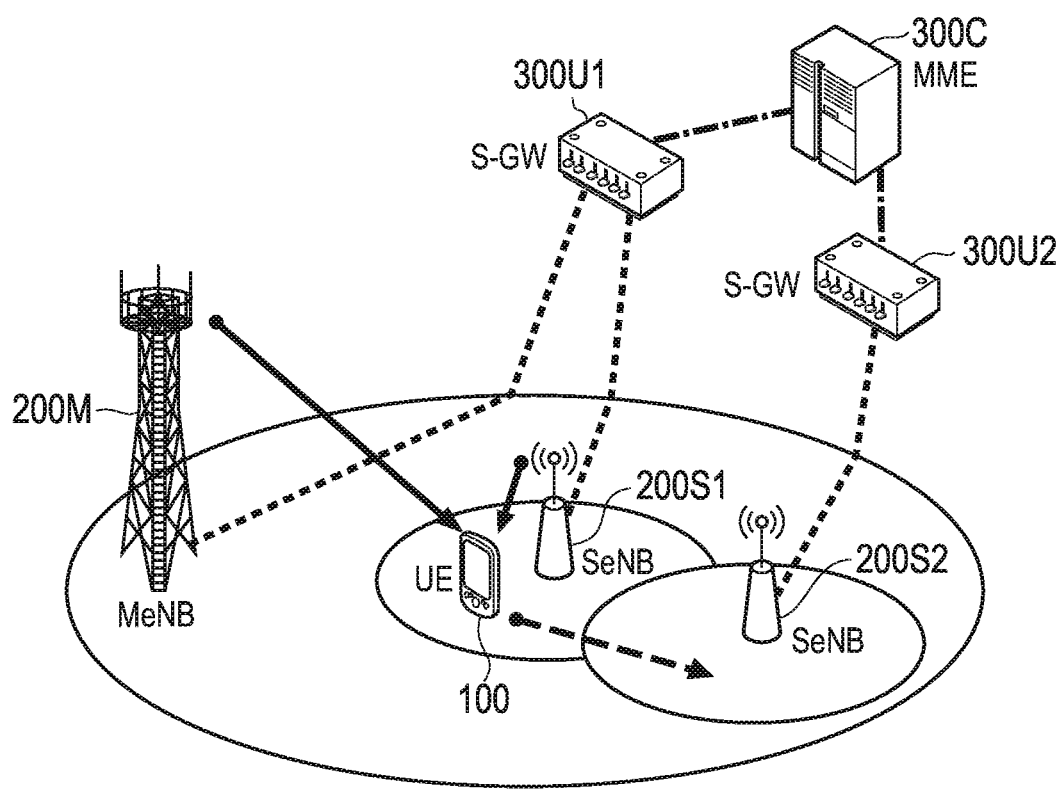
FIG. 17 is a diagram illustrating an operation scenario 2 according to the third embodiment.

FIG. 17 is a diagram illustrating an operation scenario 2 according to the third embodiment.

As illustrated in FIG. 17, in the operation scenario 2 according to the third embodiment, a configuration of an EPC 20 in the operation scenario according to the second embodiment is also considered. In the example of FIG. 17, the MeNB 200M and the SeNB 200S1 are contained in the same S-GW 300U1, and the SeNB 200S2 is contained in a different S-GW 300U2. That is, each of the MeNB 200M and the SeNB 200S1 has an S1 interface between itself and the S-GW 300U1. The SeNB 200S2 has an S1 interface between itself and the S-GW 300U2.

In this scenario, the first UP architecture is inapplicable to the MeNB 200M and the SeNB 200S2, but the second UP architecture is applicable to the MeNB 200M and the SeNB 200S2. In this scenario, on the presumption that the first UP architecture is applied, enhanced handover control as, for example, the operation patterns 2 and 3 according to the second embodiment cannot be performed.

(2) Operation According to Third Embodiment

In the third embodiment, a node that performs handover determination (HO decision) or handover acknowledgment control (Admission Control) in handover control according to the first and the second embodiments makes a determination related to the dual connectivity scheme on the basis of whether the S-GW 300U that accommodates the MeNB 200M and the S-GW 300U that accommodates SeNB 200S coincide with each other. The node is a communication control apparatus, such as the MeNB 200M or the SeNB 200S. For example, the node determines not to apply the first UP architecture when the S-GW 300U that accommodates the MeNB 200M and the S-GW 300U that accommodates the SeNB 200S do not coincide with each other.

Further, as illustrated in FIG. 16, with reference to the first embodiment, on the basis of whether the second UP architecture can be applied, the node determines whether to perform handover after releasing the connection between the SeNB 200S and the UE 100 (basic sequence), or perform handover while maintaining the connection between the SeNB 200S and the UE 100 (enhanced handover). Alternatively, on the basis of whether the S-GW 300U that accommodates the MeNB 200M2 and the S-GW 300U that accommodates the SeNB 200S coincide with each other, the node determines whether to perform handover after releasing the connection between the SeNB 200S and the UE 100 (basic sequence), or perform handover while maintaining the connection between the SeNB 200S and the UE 100 (enhanced handover).

For the MeNB 200M or the SeNB 200S to make such a determination, each eNB 200 needs to know the S-GW 300U that accommodates other eNBs 200.

Therefore, in the third embodiment, the MeNB 200M or the SeNB 200S transmits, to a neighboring eNB, identification information of the S-GW 300U that accommodates the own eNB. Here, the S-GW 300U that accommodates the own eNB is the S-GW 300U that has an S1 interface between the S-GW 300U and its own eNB. The identification information of the S-GW 300U is, for example, an S-TEID (S-GW ID) or an S-GW IP address.

Figure 18:
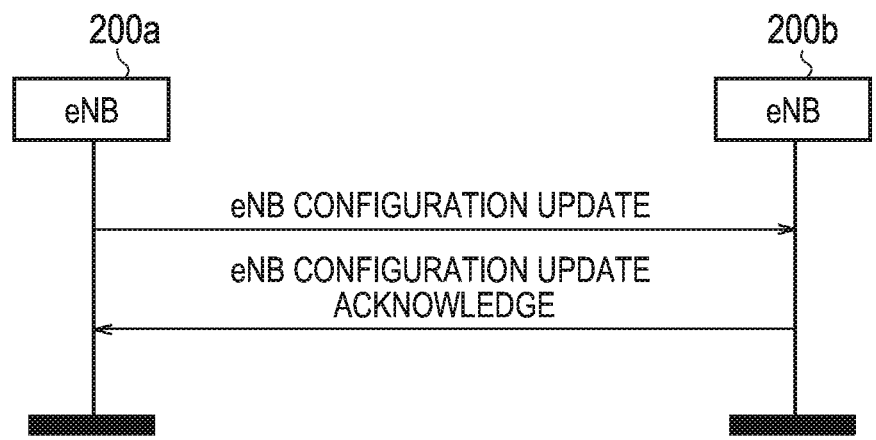
FIG. 18 is a diagram illustrating a first operation for transmitting and receiving S-GW identification information between eNBs according to the third embodiment.

FIG. 18 is a diagram illustrating a first operation for transmitting and receiving the identification information of the S-GW 300U between the eNBs 200. As illustrated in FIG. 18, the eNB 200a transmits, to the eNB 200b, identification information of the S-GW 300U containing the eNB 200a included in an eNB Configuration Update message. The eNB Configuration Update message is a message for reporting a configuration update of the eNB 200. Instead of the eNB Configuration Update message, an X2 Setup message may be used. The X2 Setup message is message for setting up an X2 interface. For example, as shown in Table 1, the identification information of the S-GW 300U is included in "Served Cell Information" of the eNB Configuration Update message.

TABLE 1

| IE/Group Name | Presence | IE type and reference | Semantics description |
| --- | --- | --- | --- |
| PCI | M | INTEGER (0 . . . 503, . . .) | Physical Cell ID |
| Cell ID | M | ECGI 9.2.14 | |
| TAC | M | OCTET STRING(2) | Tracking Area Code |

TABLE 1-continued

| IE/Group Name | Presence | IE type and reference | Semantics description |
|---|---|---|---|
| S-GW ID | O | OCTET STRING(16) | S-TEID(S-GW ID) or S-GW IP address |
| [...] | | | |

Figure 19:
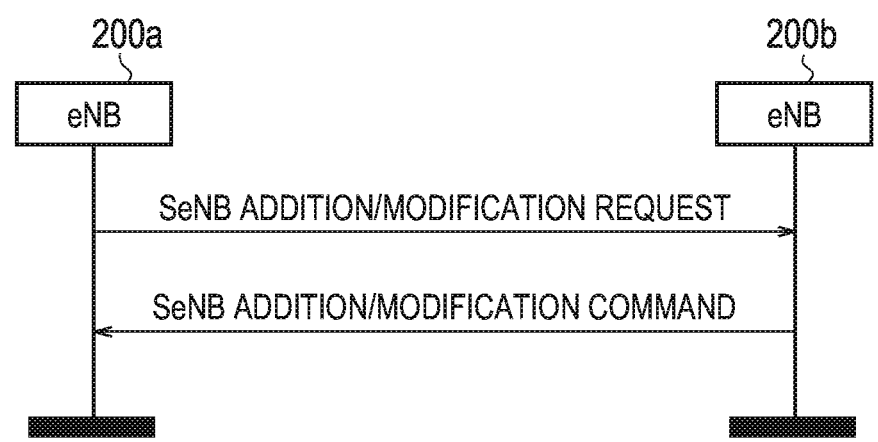
FIG. 19 is a diagram illustrating a second operation for transmitting and receiving the S-GW identification information between eNBs according to the third embodiment.

FIG. 19 is a diagram illustrating a second operation for transmitting and receiving identification information of the S-GW 300U between the eNBs 200. As illustrated in FIG. 19 and Table 2, the eNB 200a transmits, to the eNB 200b, the identification information of the S-GW 300U containing the eNB 200a included in the SeNB Addition/Modification message described above.

TABLE 2

| IE/Group Name | Presence | IE type and reference | Semantics description | Criticality | Assigned Criticality |
|---|---|---|---|---|---|
| Message Type | M | 9.2.13 | | YES | reject |
| Old eNB UE X2AP ID | M | eNB UE X2AP ID 9.2.24 | Allocated at the source eNB | YES | reject |
| Cause | M | 9.2.6 | | YES | ignore |
| Target Cell ID | M | ECGI 9.2.14 | | YES | reject |
| GUMMEI | M | 9.2.16 | | YES | reject |
| S-GW ID | O | S-GW ID | S1-TEID(S-GW ID) or IP address | YES | Ignore |
| [...] | | | | | |

Figure 20:
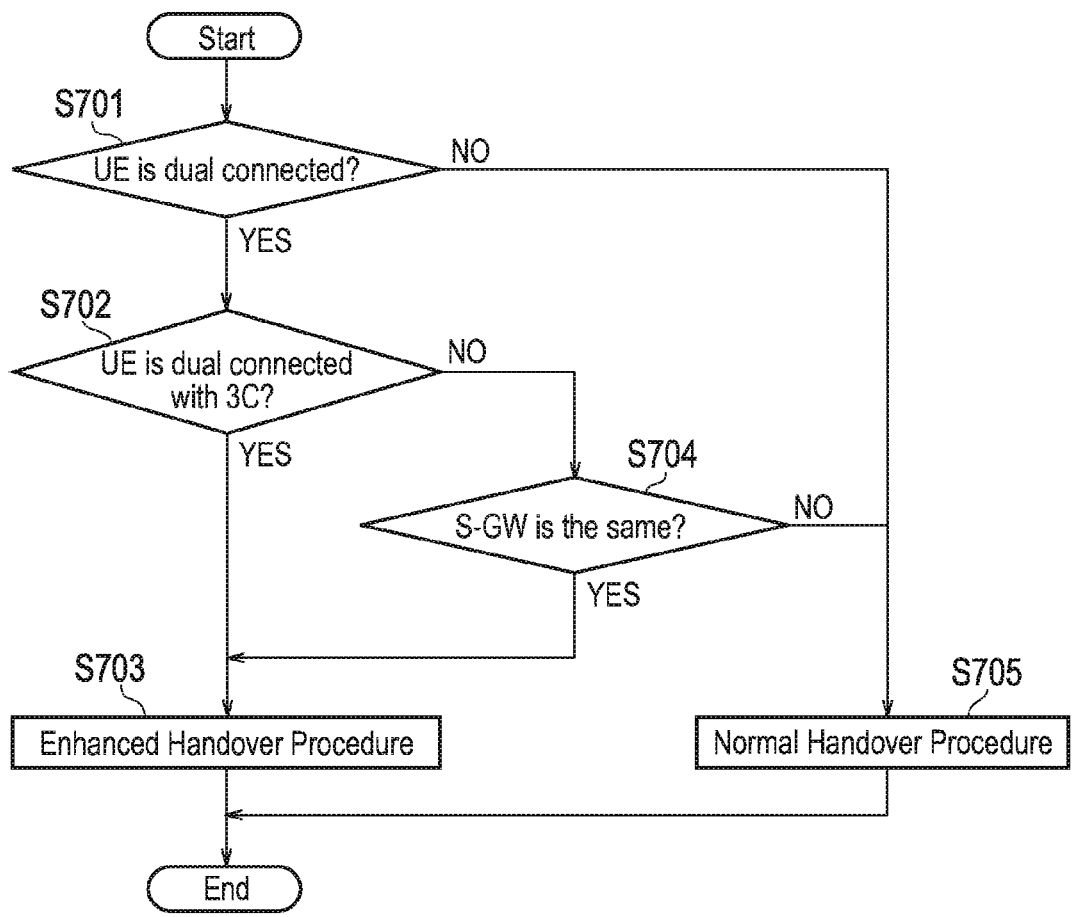
FIG. 20 is a flowchart illustrating an operation according to the third embodiment.

FIG. 20 is a flowchart illustrating an operation according to the third embodiment.

As illustrated in FIG. 20, in step S701, the node (the MeNB 200M or the SeNB 200S) determines whether the UE 100 communicates in the dual connectivity scheme. When the normal communication is performed (step S701: NO), it is determined in step S705 to perform normal handover.

When the communication is performed in the dual connectivity scheme (step S701: YES), the node determines in step S702 whether the UE 100 communicates in the second UP architecture (UP architecture "3C"). When the communication is performed in the second UP architecture (step S702: YES), the node determines in step S703 that enhanced handover according to the first and the second embodiments is performed.

On the other hand, when the UE 100 does not communicate in the second UP architecture, i.e., the UE 100 communicates in the first UP architecture (UP architecture "1A") (step S702: NO), the node determines in step S704 as to coincidence/non-coincidence of the S-GWs 300U described above. When it is determined that the S-GWs 300U coincide with each other (step S704: YES), the node determines in step S703 to perform enhanced handover according to the first and the second embodiments. On the other hand, if the S-GWs 300U do not coincide with each other (step S704: NO), the node determines in step S705 to perform normal handover.

[Other Embodiments]

In the above embodiments, inter-SeNB swapping (Swap) has been described while inter-MeNB swapping (Swap) has not been described. However, the sequence of the operation pattern 2 according to the first embodiment is applicable to the inter-MeNB swapping (Swap).

In the above embodiments, a case in which the communication in the dual connectivity scheme in a combination of the macro cell and the small cell has been described. However, the above combination is not restrictive: a communication in a dual connectivity scheme in a combination of a macro cell and a picocell and a communication in a dual connectivity scheme in a combination of a picocell and a femtocell may also be performed.

In the above embodiments, the LTE system is described as an exemplary mobile communication system, but the present invention is not limited thereto. The present invention may be applied also to other systems than the LTE system.

[Additional Statements]

1. Introduction

This additional statements discuss the mechanisms needed for MCG handover and SCG handover, taking into account various handover scenarios.

2. Terminologies

As indicated above, the functionality of "MCG handover" and "SCG handover" is one of the main agenda items for dual connectivity. Before the terms "MCG handover" and "SCG handover" are adopted, it should be first considered the implications of using these terminologies. Since MCG implies the possibility that both PCell and SCells are configured to the UE by intra-eNB Carrier Aggregation (intra-eNB CA), the use of the term "MCG handover" may be misleading and may contradict with the existing intra-eNB CA handover procedure, since the existing intra-eNB CA procedure only allows PCell handover. However, the existing intra-eNB CA procedure may imply a capability on combining PCell handover with DC functionality. Although such functionality is not yet assumed in pre-Rel-12, to facilitate further discussion on this functionality, it is suggested that the term "PCell handover with DC" be used to refer to such functionality. Further details on the usefulness of this functionality are discussed later.

Observation 1: MCG handover consisting of both PCell and SCells is not permitted according to the existing intra-eNB CA handover procedure Proposal 1: PCell handover with DC should be used to refer to the handover between two MeNBs while dual connectivity is activated. It is FFS whether such functionality is really needed.

Similarly, it is suggested that "Special Cell handover" be used to describe the handover between two SeNBs instead of "SCG handover". This would provide consistent procedure with the handovers between two MeNBs.

Proposal 2: Special Cell handover should be used to refer to the handover between two SeNBs during dual connectivity. It is FFS whether such functionality is really needed.

3. Handover scenarios

Figure 21:
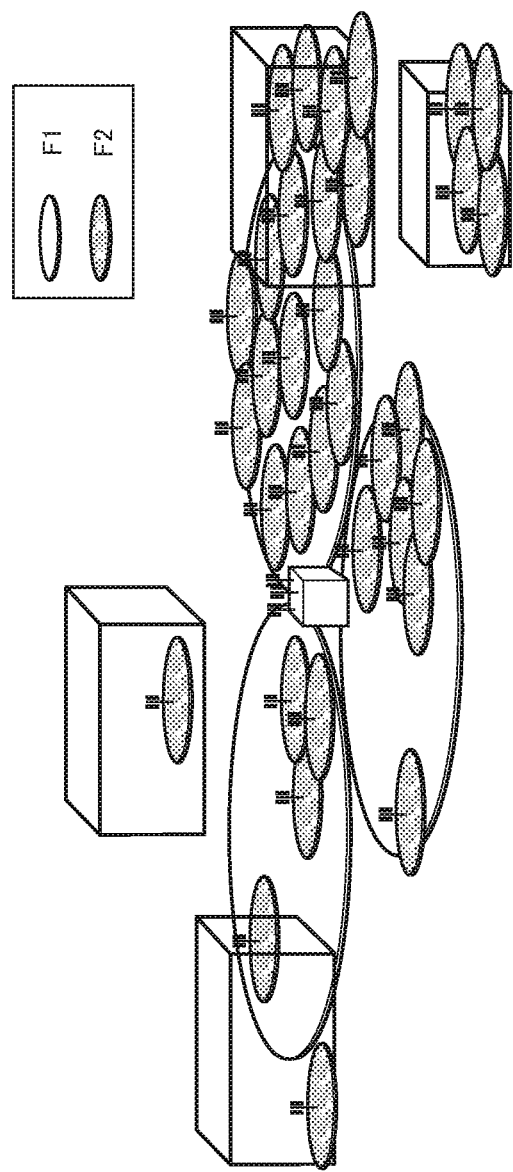
FIG. 21 is a diagram according to additional statements of the embodiments.

The targeted deployment scenario is shown in FIG. 21. The dense small cell deployment shown in FIG. 21 was required to support huge traffic in some scenarios e.g. dense urban or large shopping mall. In particular, with dense small cell deployments, it's reasonable to expect many small cells deployed at boundaries of macro cells (refer to the upper right macro cell in FIG. 21, as an example).

Observation 2: Many small cells may be deployed near macro cells boundaries.

As a result of observation 2, handover procedures with dual connectivity should not be excluded for consideration. Specifically, PCell handover with DC may be useful under the following scenario:

Scenario M1: A SeNB is deployed on the cell edge between a source MeNB (S-MeNB) and a target MeNB (T-MeNB). (FIG. 8)

And Special Cell handover may be useful under the following scenario:

Scenario S2: A source SeNB (S-SeNB) and a target SeNB (T-SeNB) are deployed within coverage of a MeNB. (FIG. 12)

Figure 22:
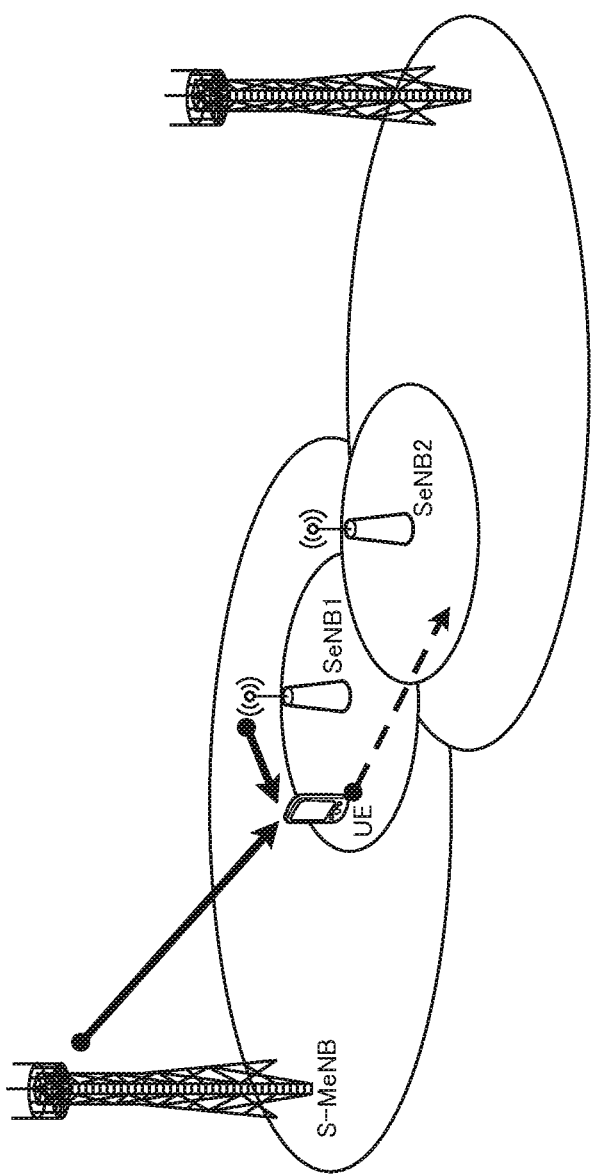
FIG. 22 is a diagram according to the additional statements of the embodiments.

Finally, a combination of PCell handover with DC and Special Cell handover may be useful under the following scenario:

Scenario M3: A SeNB (SeNB1) is deployed within coverage of S-MeNB and a neighbor SeNB (SeNB2) is deployed within coverage of T-MeNB. Note that the cell edges between MeNBs and the cell edges between SeNBs are in the same region. (FIG. 22)

Proposal 3: taking into account the three handover scenarios involving dual connectivity.

4. Possible handover procedures 4.1. PCell Handover with DC 4.1.1. Scenario M1

4.1.1.1. Issues with current handover procedure

Figure 23:
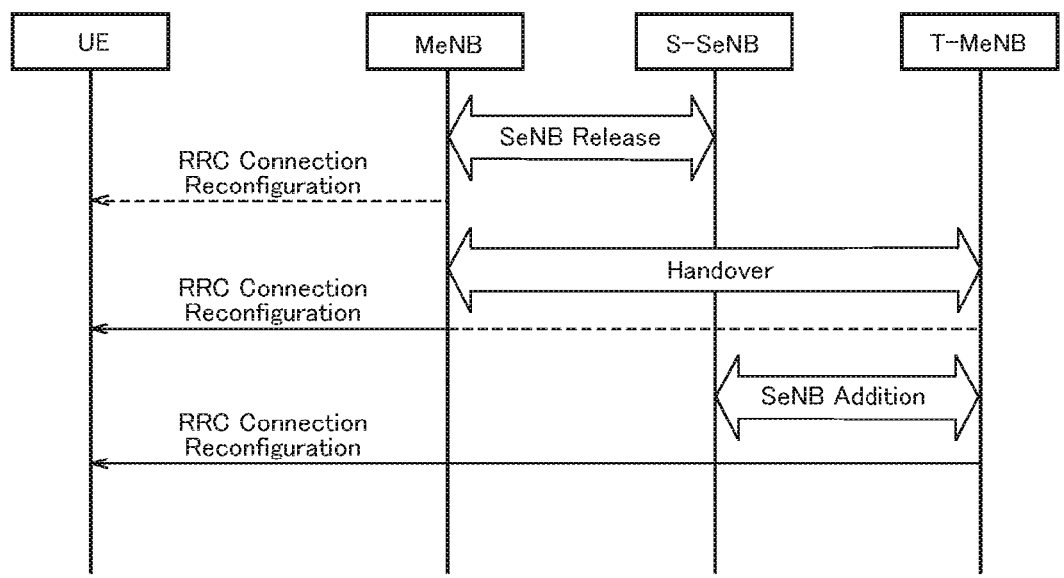
FIG. 23 is a diagram according to the additional statements of the embodiments.

A straightforward application of the current handover procedure with dual connectivity for Scenario M1 is illustrated in FIG. 23. This handover procedure assumes three RRC Connection Reconfiguration messages are needed to complete the handover for dual connectivity; one for the release of SeNB, one for the MeNB handover and one for the addition of the same SeNB. The increased number of RRC Connection Reconfiguration messages for this handover procedure may result in more occasions of RLF/HOF as well as throughput degradations.

Observation 3: With Scenario M1, the current procedure for releasing and adding the same SeNB during a PCell handover requires multiple RRC Connection Reconfigurations that may lead to increased RLF/HOF.

4.1.1.2. Details of PCell Handover with DC

Figure 24:
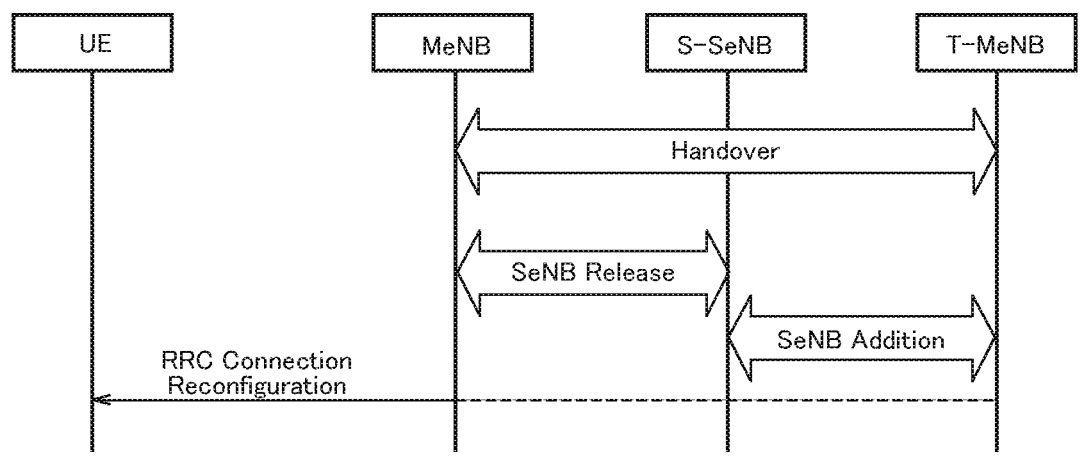
FIG. 24 is a diagram according to the additional statements of the embodiments.

To reduce the number of unnecessary RRC Connection Reconfigurations, an enhanced handover procedure may be considered as described in FIG. 24. The procedure allows the UE to keep at least the Special Cell during the PCell handover with DC so that only one RRC Connection Reconfiguration is needed. The PCell handover with DC may be realized using one of the following alternatives:

ALT 1: The handover request message may include parameters associated with the existing SeNB configurations, so that the T-MeNB may initiate SeNB addition procedure towards the SeNB.

ALT 2: The handover request message may include a simple indication that the handover procedure involves dual connectivity. The T-MeNB (or possibly the SeNB) initiates SeNB addition procedure before handover completion.

With either alternative, it is assumed that after the admission control in T-MeNB, the SeNB is released from S-MeNB and added to T-MeNB in advance of reconfiguration of the UE. Subsequently, the T-MeNB will send an RRC container with both configurations for handover and SeNB addition to the S-MeNB where the final RRC Connection Reconfiguration will be sent to the UE.

Observation 4: Enhanced PCell handover with DC procedure can reduce the number of RRC Connection Reconfiguration messages and allow the UE to keep the SCG configuration.

Proposal 4: it should be decided if either of the two alternatives should be used to realize PCell handover with DC.

Proposal 5: it is necessary to consider the option to enhance the MeNB handover procedure involving dual connectivity with just one RRC Connection Reconfiguration.

4.2. Special Cell Handover 4.2.1. Scenario S2

Figure 25:
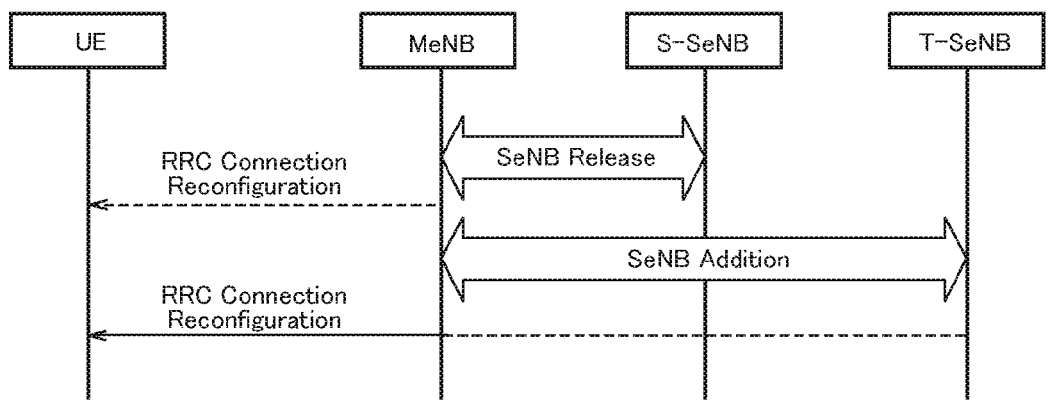
FIG. 25 is a diagram according to the additional statements of the embodiments.

The concept of Special Cell handover is new; however, this may be easily realized using the current handover procedure and SeNB addition/modification/release procedures as shown in FIG. 25.

In contrast to PCell handover with DC, Special Cell handover can be realized by using the SeNB Addition/Modification and SeNB Release functionalities in the SeNB Addition/Modification Request message since the RRC entity with the MeNB remains unchanged for the UE. Base on the procedure in FIG. 25, two RRC Connection Reconfiguration messages are needed. However, this can be easily reduced if the SeNB Release Response message does not contain an RRC container which means the MeNB will not need to send an RRC Reconfiguration Message to the UE just to release the S-SeNB. And this is in-line with the following agreements.

5) The MeNB does not change the content of the RRC configuration provided by the SeNB. -FFS whether the MeNB requests the SeNB to release a serving cell for one of its UEs and the SeNB creates a container that will result in the release of a serving cell. Or whether the MeNB can by itself release a serving cell maintained by the SeNB. -FFS whether the MeNB needs to comprehend or may reject the RRC Container received from the SeNB. -FFS how MeNB and SeNB "share" e.g. the L1 processing capabilities.

Observation 5: The number of RRC Connection Reconfiguration messages used in the Special Cell handover can be reduced if an RRC container is not included within the SeNB Release Response message.

Figure 26:
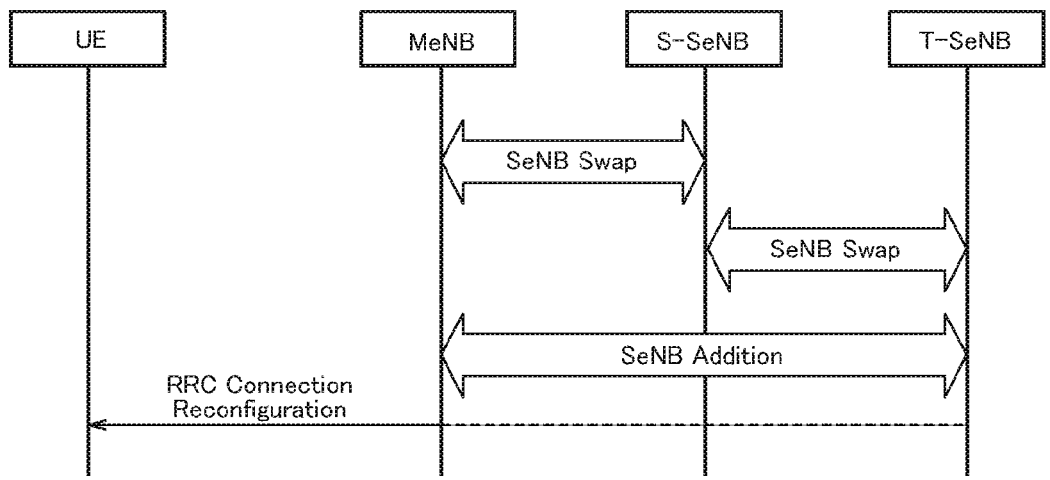
FIG. 26 is a diagram according to the additional statements of the embodiments.

Another alternative is to define a new message such as the "SeNB Swap Request" without an RRC container. Referring to FIG. 26, either the MeNB or the S-eNB may initiate the SeNB Swap procedure which is used to inform the other eNB of the Special Cell handover. After coordination between eNBs is completed, the T-SeNB sends the Addition/Modification Command containing RRC container to the MeNB, whereby the MeNB may subsequently forward the RRC container within the RRC Connection Reconfiguration to the UE.

Proposal 6: it is necessary to decide if the SeNB Release Response should include the RRC container for the Special Cell handover.

4.3. Scenario M3

In this scenario, the cell edges of both MeNBs and SeNBs are in the same region. There are three alternatives to be considered.

ALT1: PCell handover is initiated after SeNB1 release. This is the same as current intra-eNB PCell handover procedure. SeNB2may be added after HO completion.

ALT2: PCell handover with DC is initiated while the SeNB1configuration is kept. Then a Special cell handover is separately initiated from SeNB1 to SeNB2. This alternative basically assumes the handover procedure for M1 and S2 are separately initiated.

ALT3: Both PCell handover with DC and Special cell handover are initiated simultaneously. It needs a parallel handover procedure combining scenarios M1 and S2.

With ALT2 and ALT3, a separate handover enhancement procedure is not needed. Instead, it is sufficient to reuse the handover procedures discussed for scenario M1 and scenario S2.

Observation 6 : Enhanced handover procedure for Scenario M1 and S2 may be applicable to Scenario M3. A separate enhanced procedure for Scenario M3 is not needed.

5. Other constraints for handover scenario

Xn functionality for dual connectivity is realized over the existing X2 interface. Therefore, enhanced dual connectivity procedure is not applicable over the S1 interface. For handovers with dual connectivity, the SeNB should be released from the UE before S1 handover procedure is completed.

Observation 7: Enhanced handover procedures for dual connectivity should only be applicable over the X2 interface.

INDUSTRIAL APPLICABILITY

The present disclosure is useful for mobile communication fields.

The invention claimed is:

1. A master evolved Node-B (MeNB) that connects to a user terminal together with a secondary evolved Node-B (SeNB) in a dual connectivity scheme, the MeNB comprising:
a transmitter configured to transmit an SeNB modification request message to the SeNB after the SeNB prepares resources for the dual connectivity scheme, via an X2 interface established between the MeNB and the SeNB, wherein
the SeNB modification request message requests the SeNB to modify the resources for the dual connectivity scheme,
the SeNB modification request message includes identification information of a serving gateway connected with the MeNB via an S1 interface, the serving gateway included in an evolved packet core (EPC) and performing transfer control of data, and
the identification information includes an S1 tunnel endpoint ID (S1-TEID) of the serving gateway and an internet protocol (IP) address of the serving gateway.

2. A secondary evolved Node-B (SeNB) that connects to a user terminal together with a master evolved Node-B (MeNB) in a dual connectivity scheme, the SeNB comprising:
a receiver configured to receive an SeNB modification request message from the MeNB after the SeNB prepares resources for the dual connectivity scheme, via an X2 interface established between the MeNB and the SeNB, and the SeNB modifies the resources for the dual connectivity scheme based on the received SeNB modification request message, wherein
the SeNB modification request message requests the SeNB to modify the resources for the dual connectivity scheme,
the SeNB modification request message includes identification information of a serving gateway connected with the MeNB via an S1 interface, the serving gateway included in an evolved packet core (EPC) and performing transfer control of data, and
the identification information includes an S1 tunnel endpoint ID (S1-TEID) of the serving gateway and an internet protocol (IP) address of the serving gateway.

3. An apparatus comprising:
a processor and a memory coupled to the processor, the processor configured to control a master evolved Node-B (MeNB) that connects to a user terminal together with a secondary evolved Node-B (SeNB) in a dual connectivity scheme, wherein
the processor executes a process of transmitting an SeNB modification request message to the SeNB after the SeNB prepares resources for the dual connectivity scheme, via an X2interface established between the MeNB and the SeNB,
the SeNB modification request message requests the SeNB to modify the resources for the dual connectivity scheme,
the SeNB modification request message includes identification information of a serving gateway connected with the MeNB via an S1 interface, the serving gateway included in an evolved packet core (EPC) and performing transfer control of data, and
the identification information includes an S1 tunnel endpoint ID (S1-TEID) of the serving gateway and an internet protocol (IP) address of the serving gateway.

4. An apparatus comprising:
a processor and a memory coupled to the processor, the processor configured to control a secondary evolved Node-B (SeNB) that connects to a user terminal together with a master evolved Node-B (MeNB) in a dual connectivity scheme, wherein
the processor executes a process of receiving an SeNB modification request message from the MeNB after the SeNB prepares resources for the dual connectivity scheme, via an X2interface established between the MeNB and the SeNB, and the SeNB modifies the resources for the dual connectivity scheme based on the received SeNB modification request message,
the SeNB modification request message requests the SeNB to modify the resources for the dual connectivity scheme,
the SeNB modification request message includes identification information of a serving gateway connected with the MeNB via an S1 interface, the serving gateway included in an evolved packet core (EPC) and performing transfer control of data, and
the identification information includes an S1 tunnel endpoint ID (S1-TEID) of the serving gateway and an internet protocol (IP) address of the serving gateway.

5. The MeNB according to claim 1, wherein
the transmitter is configured to transmit the S1-TEID and the IP address in the message, and the S1-TEID and the IP address enable the SeNB to transfer data from the user terminal to the serving gateway.

6. The SeNB according to claim 2, wherein
the receiver is configured to receive the S1-TEID and the IP address in the message, and the S1-TEID and the IP address enable the SeNB to transfer data from the user terminal to the serving gateway.

7. The apparatus according to claim 3, wherein
the processor executes the process of transmitting the S1-TEID and the IP address in the message, and the S1-TEID and the IP address enable the SeNB to transfer data from the user terminal to the serving gateway.

8. The apparatus according to claim 4, wherein
the processor executes the process of receiving the S1-TEID and the IP address in the message, and the S1-TEID and the IP address enable the SeNB to transfer data from the user terminal to the serving gateway.

9. The MeNB according to claim 1, further comprising:
a receiver configured to receive a handover request message from a source MeNB, the handover request message requesting a handover of the user terminal from the source MeNB to the MeNB, wherein the handover request message includes parameters of configurations of the SeNB; and
a controller configured to decide to keep the SeNB based on the handover request message, wherein in response to deciding to keep the SeNB, the transmitter transmits a SeNB addition request message to the SeNB, the SeNB addition request message including the S1-TEID and the IP address.

10. The MeNB according to claim 9, wherein
the receiver is configured to receive the handover request message, the handover request message further including information indicating an inter-MeNB handover without changing the SeNB.

11. The apparatus according to claim 3, wherein
the processor further executes processes of
receiving a handover request message from a source MeNB, the handover request message requesting a handover of the user terminal from the source MeNB to the MeNB, wherein the handover request message includes parameters of configurations of the SeNB; and
deciding to keep the SeNB based on the handover request message; and
in response to deciding to keep the SeNB, transmitting a SeNB addition request message to the SeNB, the SeNB addition request message including the S1-TEID and the IP address.

12. The apparatus according to claim 11, wherein
the handover request message further includes information indicating an inter-MeNB handover without changing the SeNB.

13. The MeNB according to claim 1, wherein the identification information enables the SeNB to use the same serving gateway as the MeNB to perform a dual connectivity communication with the user terminal.

14. The SeNB according to claim 2, wherein the identification information enables the SeNB to use the same serving gateway as the MeNB to perform a dual connectivity communication with the user terminal.

15. The apparatus according to claim 3, wherein the identification information enables the SeNB to use the same serving gateway as the MeNB to perform a dual connectivity communication with the user terminal.

16. The apparatus according to claim 4, wherein the identification information enables the SeNB to use the same serving gateway as the MeNB to perform a dual connectivity communication with the user terminal.

* * * * *